(12) United States Patent
Hyun

(10) Patent No.: US 10,716,651 B2
(45) Date of Patent: Jul. 21, 2020

(54) ORAL CARE DEVICE AND ORAL CARE METHOD

(71) Applicant: DR. PIK CO., LTD., Seoul (KR)

(72) Inventor: Ki-Bong Hyun, Seoul (KR)

(73) Assignee: DR. PIK CO., LTD., Seoul (KR)

( * ) Notice: Subject to any disclaimer, the term of this patent is extended or adjusted under 35 U.S.C. 154(b) by 0 days.

(21) Appl. No.: 15/871,367

(22) Filed: Jan. 15, 2018

(65) Prior Publication Data

US 2018/0368957 A1 Dec. 27, 2018

(30) Foreign Application Priority Data

Jun. 27, 2017 (KR) .................... 10-2017-0080960
Aug. 4, 2017 (KR) .................... 10-2017-0098938
(Continued)

(51) Int. Cl.
*A61C 17/02* (2006.01)
*A61C 17/22* (2006.01)
(Continued)

(52) U.S. Cl.
CPC .......... *A61C 17/0211* (2013.01); *A46B 9/045* (2013.01); *A46B 13/06* (2013.01);
(Continued)

(58) Field of Classification Search
CPC ..... A61C 17/04; A61C 17/028; A61C 17/228; A61C 17/0208; A61C 17/0211;
(Continued)

(56) References Cited

U.S. PATENT DOCUMENTS 3,566,869 A * 3/1971 Crowson ............ A61C 17/0211
433/80
3,731,675 A * 5/1973 Kelly ................. A61C 17/0211
601/164
(Continued)

FOREIGN PATENT DOCUMENTS

JP          6-64522 U     9/1994
JP    2002 0253582 A    10/2002
(Continued)

OTHER PUBLICATIONS

Office Action for corresponding Patent Application No. KR 10-2017-0115286 dated Jun. 12, 2018.
(Continued)

*Primary Examiner* — Cris L. Rodriguez
*Assistant Examiner* — Matthew P Saunders
(74) *Attorney, Agent, or Firm* — Renner, Otto, Boisselle & Sklar, LLP

(57) ABSTRACT

An oral care device for providing oral-cavity information to a user or a manager includes: a liquid supply unit; a mouthpiece connected to the liquid supply unit and including a spatial portion configured to accommodate at least one of an upper tooth side and a lower tooth side when the mouthpiece is inserted into an oral cavity; a pump connected to the mouthpiece and configured to suction liquid from the liquid supply unit and introduce the liquid into the spatial portion and to suction fluid from the spatial portion; a storage unit connected to the pump and configured to store or discharge fluid suctioned from the spatial portion; and a measuring unit connected to the storage unit and configured to measure a state of fluid stored in the storage unit, wherein liquid is introduced to the spatial portion from the liquid supply unit only by suction force of the pump.

17 Claims, 31 Drawing Sheets

(30) Foreign Application Priority Data

Sep. 8, 2017 (KR) .......................... 10-2017-0115286
Nov. 24, 2017 (KR) .......................... 10-2017-0157918

(51) Int. Cl.
*A46B 9/04* (2006.01)
*A46B 13/06* (2006.01)

(52) U.S. Cl.
CPC ...... *A61C 17/0208* (2013.01); *A61C 17/0217* (2013.01); *A61C 17/228* (2013.01); *A46B 2200/1066* (2013.01)

(58) Field of Classification Search
CPC ... A61C 17/0217; A61C 19/063; A46B 9/045; A46B 13/06
USPC .............. 433/80; 424/49; 601/162, 164
See application file for complete search history.

(56) References Cited

U.S. PATENT DOCUMENTS

| | | | | |
|---|---|---|---|---|
| 4,560,351 | A * | 12/1985 | Osborne | A61C 19/08 433/215 |
| 7,125,251 | B2 * | 10/2006 | Livolsi | A61C 9/0006 433/41 |
| 8,591,229 | B2 * | 11/2013 | Keller | A61C 19/063 433/80 |
| 9,788,922 | B2 * | 10/2017 | Jacoby | A61C 17/0208 |
| 2005/0037315 | A1 | 2/2005 | Inoue et al. | |
| 2014/0093836 | A1 * | 4/2014 | Wolpo | A61C 17/3481 433/32 |
| 2014/0194792 | A1 | 7/2014 | Martin et al. | |
| 2014/0227657 | A1 * | 8/2014 | Sanders | A61C 19/066 433/32 |
| 2015/0024340 | A1 * | 1/2015 | De Gentile | A61C 17/0211 433/82 |
| 2016/0067022 | A1 * | 3/2016 | Jetton | A61H 13/005 433/92 |
| 2016/0235509 | A1 | 8/2016 | Freiberg et al. | |
| 2016/0296310 | A1 * | 10/2016 | Jacoby | A61C 17/0208 |
| 2017/0056143 | A1 * | 3/2017 | Hyun | A61C 17/02 |
| 2017/0165040 | A1 * | 6/2017 | Wolgin | A61M 1/009 |

FOREIGN PATENT DOCUMENTS

| | | |
|---|---|---|
| JP | 2005-058486 A | 3/2005 |
| JP | 2012 192002 A | 11/2012 |
| JP | 2013 502260 A | 1/2013 |
| KR | 10 0959672 B1 | 2/2008 |
| KR | 10 2011 0015097 A | 2/2011 |
| KR | 10-1706070 B1 | 10/2014 |
| KR | 10-1449724 B1 | 2/2017 |

OTHER PUBLICATIONS

Office Action for corresponding Patent Application No. KR 10-2017-0098938 dated Jun. 18, 2018.
Office Action for corresponding Patent Application No. KR 10-2017-0157918 dated Aug. 29, 2018.
Office Action for corresponding Patent Application No. JP 2018-006390 dated Sep. 4, 2018.
International Search Report corresponding to International Application No. PCT/KR2017/006892.

* cited by examiner

ORAL CARE DEVICE AND ORAL CARE METHOD

CROSS-REFERENCE TO RELATED APPLICATION(S)

This application claims benefit of priority to Korean Patent Applications No. 10-2017-0080960 filed on Jun. 27, 2017, 10-2017-0098938 filed on Aug. 4, 2017, 10-2017-0115286 filed on Sep. 8, 2017 and 10-2017-0157918 filed on Nov. 24, 2017 in the Korean Intellectual Property Office, the disclosures of which are incorporated herein by reference in their entirety.

BACKGROUND

1. Field

The present disclosure relates to an oral care device for caring for the oral cavity, and more particularly, to an oral care device and an oral care method for supplying liquid to the oral cavity and collecting the liquid without leakage.

2. Description of Related Art

Food remaining on teeth or in the oral cavity decays over time, causing halitosis, dental caries, and various oral diseases such as gingival disease. The oral cavity should always be kept clean, for example, through frequent toothbrushing and the use of mouthwash, so as to maintain the teeth and oral cavity in a healthy state.

In general, toothbrushes and dental floss are used to clean teeth. However, it is difficult to completely remove food remaining between teeth only by toothbrushing and flossing, and excessive toothbrushing or flossing may damage gums or periodontal tissue.

Therefore, various oral cleaning devices configured to clean the oral cavity by injecting cleaning water have been proposed. Oral cleaning devices of the related art are configured to inject water or a germicidal cleaning liquid into the oral cavity at high pressure to remove food remaining in the oral cavity or between teeth, and to this end, such an oral cleaning device includes a cleaning liquid container, an injection nozzle, and a pump for supplying a cleaning liquid from the cleaning liquid container to the injection nozzle.

However, since such oral cleaning devices of the related art are configured to inject a cleaning liquid through an injection nozzle, the oral cleaning devices are only usable in limited places such as bathrooms, because the cleaning liquid may splatter to the outside of the oral cavity.

Thus, as disclosed in Patent Document 1, devices and methods for cleaning the oral cavity, particularly teeth, by supplying liquid to a mouthpiece structure and discharging the liquid without leakage have been proposed.

In such a device, as disclosed in Patent Document 1, a double-structure mouthpiece functions as a chamber for distributing introduced liquid so as to uniformly supply the liquid to teeth.

However, since the mouthpiece has a double structure, it is difficult to manufacture the mouthpiece, and since liquid is supplied to teeth after passing through the chamber, it is difficult to control the liquid.

In addition, when liquid is pressurized and supplied to the mouthpiece to obtain a sufficient liquid supply velocity, the mouthpiece may be spaced apart from teeth and gums due to a reaction of teeth to injected liquid, thereby causing leakage of liquid between the mouthpiece and the gums. This may also occur when liquid is suctioned from the mouthpiece using a suction pump.

It may not be difficult for normal users to discharge leaking liquid to the outside of their body. However, in the case of children or invalids, leaking liquid may flow into the throat.

In particular, since unconscious patients cannot discharge leaking liquid to the outside of their body, cleaning water injection devices may not be used for extended-stay patients in hospitals.

(Patent Document 1) KR10-1449724 B

SUMMARY

An aspect of the present disclosure may provide an oral care device configured to prevent leakage of liquid to the outside of a care region.

The present disclosure provides an oral care device as described below.

According to an aspect of the present disclosure, an oral care device includes: a liquid supply unit; a care unit connected to the liquid supply unit and including a spatial portion configured to accommodate at least one of an upper tooth side and a lower tooth side when the care unit is inserted into an oral cavity; a suction unit connected to the care unit and configured to suction fluid from the liquid supply unit and introduce the fluid into the spatial portion and to suction fluid from the spatial portion; and a discharge unit connected to the suction unit and configured to store or discharge liquid suctioned from the spatial portion, wherein liquid is introduced to the spatial portion from the liquid supply unit only by suction force of the suction unit.

In an embodiment, a liquid supply path to which the liquid supply unit and the care unit are connected may be provided with a liquid control unit to control an introduction of liquid into the spatial portion.

In an embodiment, the spatial portion of the care unit may be connected to an external connection path communicating with an external region, and an air control unit may be provided in the external connection path to control an introduction of external air into the spatial portion.

In an embodiment, the oral care device may further include a control unit connected to the liquid control unit and the air control unit and configured to control the liquid control unit and the air control unit in a liquid supply mode in which the liquid supply unit and the spatial portion communicate with each other and the suction unit introduces liquid into the spatial portion, an air supply mode in which air is supplied, a vacuum mode in which both liquid and air are not introduced, and a mode in which both liquid and air are supplied.

In an embodiment, the oral care device may further include: an additional ingredient supply unit connected to the care unit to supply a liquid different from a liquid of the liquid supply unit; and an additional ingredient control unit provided in the additional ingredient supply unit for controlling supply of an additional ingredient.

In an embodiment, the care unit may include a fluid inlet connected to the liquid supply unit or the external connection path and a fluid outlet connected to the suction unit, wherein the spatial portion of the care unit may be formed by a flexible outer wall, a plurality of protrusions may protrude inward from the outer wall, and surfaces of the protrusions may be machined to increase friction.

In an embodiment, the care unit may be shaped like a mouthpiece, and the fluid inlet and the fluid outlet may be respectively disposed on left and right sides of the mouthpiece or front and rear sides of the mouthpiece.

In an embodiment, the care unit may include a fluid inlet connected to the liquid supply unit and a fluid outlet connected to the suction unit, wherein the spatial portion of the care unit may be formed of a single outer wall, and fluid introduced through the fluid inlet may be discharged through the fluid outlet after passing through the spatial portion.

In an embodiment, the outer wall may include a contact region making contact with teeth and gums, and a non-contact region selectively separate from the teeth and gums to provide a path through which liquid flows.

In an embodiment, the non-contact region may include a region corresponding to upper surfaces of the teeth and a region between the teeth, and a region between the teeth and the gums, and the care unit may have a customized structure to which a liquid path is added, based on a user's tooth shape.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
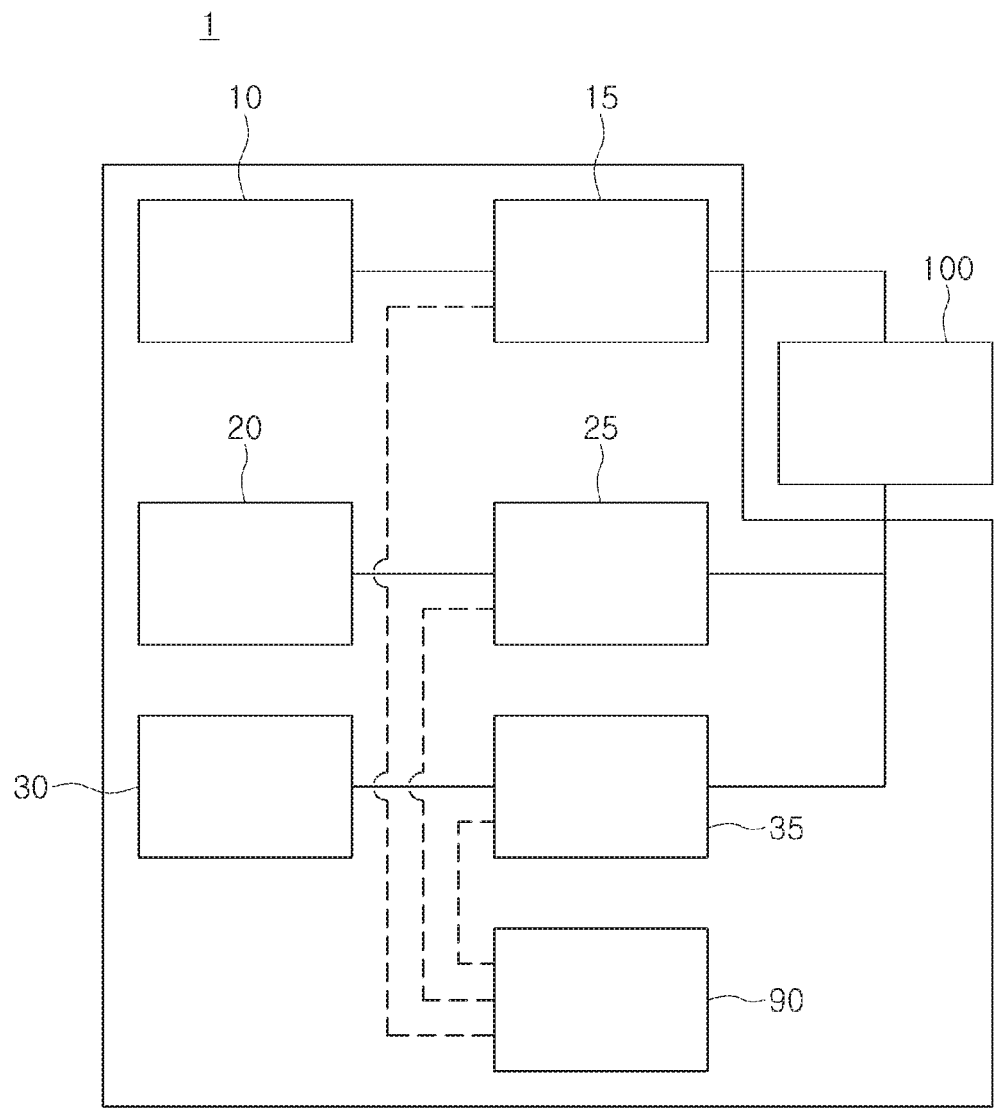
FIG. 1 is a schematic view illustrating an oral care device according to an embodiment of the present disclosure.

In the present disclosure, the word "fluid" is a term including both liquids and gases, and a suction unit is capable of suctioning either liquid or gas, or both.

In the present disclosure, the term "oral cavity" refers to the inside of the mouth of a mammal, including a human, and also refers to the gums, including or not including the teeth.

In the present disclosure, the term "sealing" is used to denote a state in which liquid substantially does not leak. That is, the term "sealing" is used to denote a state in which liquid does not leak to the outside of a care unit, and thus the respiratory track, esophagus, or other oral regions of a user are not irritated.

The present disclosure does not include a method of pressuring fluid to supply the fluid to the oral cavity. In the present disclosure, liquid of a liquid supply unit is forced to pass through the oral cavity by negative pressure formed by a suction unit, and then the liquid is discharged to a discharge unit. However, the present disclosure does not include supply of liquid from the liquid supply unit to the oral cavity using another pressurizing unit. In this case, for example, suction pressure may be about 100 mmHg to about 600 mmHg. After the suction unit suctions air from a spatial portion of the care unit to bring the care unit into tight contact with the gums of a user, liquid is introduced to the oral cavity from the liquid supply unit.

The present disclosure includes liquid for cleaning teeth and having an effect on teeth or gums. The liquid may include particles of abrasive or whitener. In some embodiments, an antimicrobial compound containing ethanol or another alcohol may be used.

Another example of the liquid may include an antimicrobial compound containing an antimicrobial agent, propanol, and a vehicle. Non-limiting examples of typical antimicrobial agents include an essential oil, cetylpyridinium chloride (CPC), chlorhexidine, hexetidine, chitosan, triclosan, stannous fluoride, soluble pyrophosphate, and zinc oxide. Other non-limiting examples of typical antimicrobial agents include metal oxides, peppermint oil, sage oil, aloe extract, polyol, protease, lipase, amylase, and zinc citrate. Other non-limiting typical examples of the antimicrobial agent include metal salts.

The present disclosure is provided to improve a harmful state of the oral cavity and aesthetic appearance of the oral cavity in addition to improving the hygienic state of the oral cavity by cleaning the oral cavity to remove or decompose plaque, fine food particles, bio-films, or the like. Non-limiting examples of the harmful state may include symptoms, halitosis, and infection relating to dental caries, gingivitis, inflammation, or periodontal disease.

The oral care device or the oral care method of the present disclosure may be used at home, in hospital for unconscious critical patients, or in dental clinics during, before, or after dental treatment, so as to clean teeth or provide an effect on teeth.

In the present disclosure, solenoid values may be used for controlling liquid/fluid/air. However, other electromechanical devices may be used. Such devices may be electronically controlled, and to this end, electrically controllable devices may be used.

According to the present disclosure, a care unit may be provided according to the average body size of users, and in some cases, a care unit customized according to the oral cavity structure of a user may be fabricated. This will be described with reference to FIGS. 15 to 17.

In addition, the oral care device of the present disclosure may be provided in the form of a variable mouthpiece configured to be varied according to the oral cavity structure of a user within a certain range. This will be described with reference to FIGS. 18A to 26C.

The variable mouthpiece may be deformed when inserted into the oral cavity of a user. That is, the variable mouthpiece refers to a structure deformable before the use of the oral care device. The variable mouthpiece may be deformed by suction force of the oral care device.

Hereinafter, specific embodiments of the present disclosure will be described.

Figure 2:
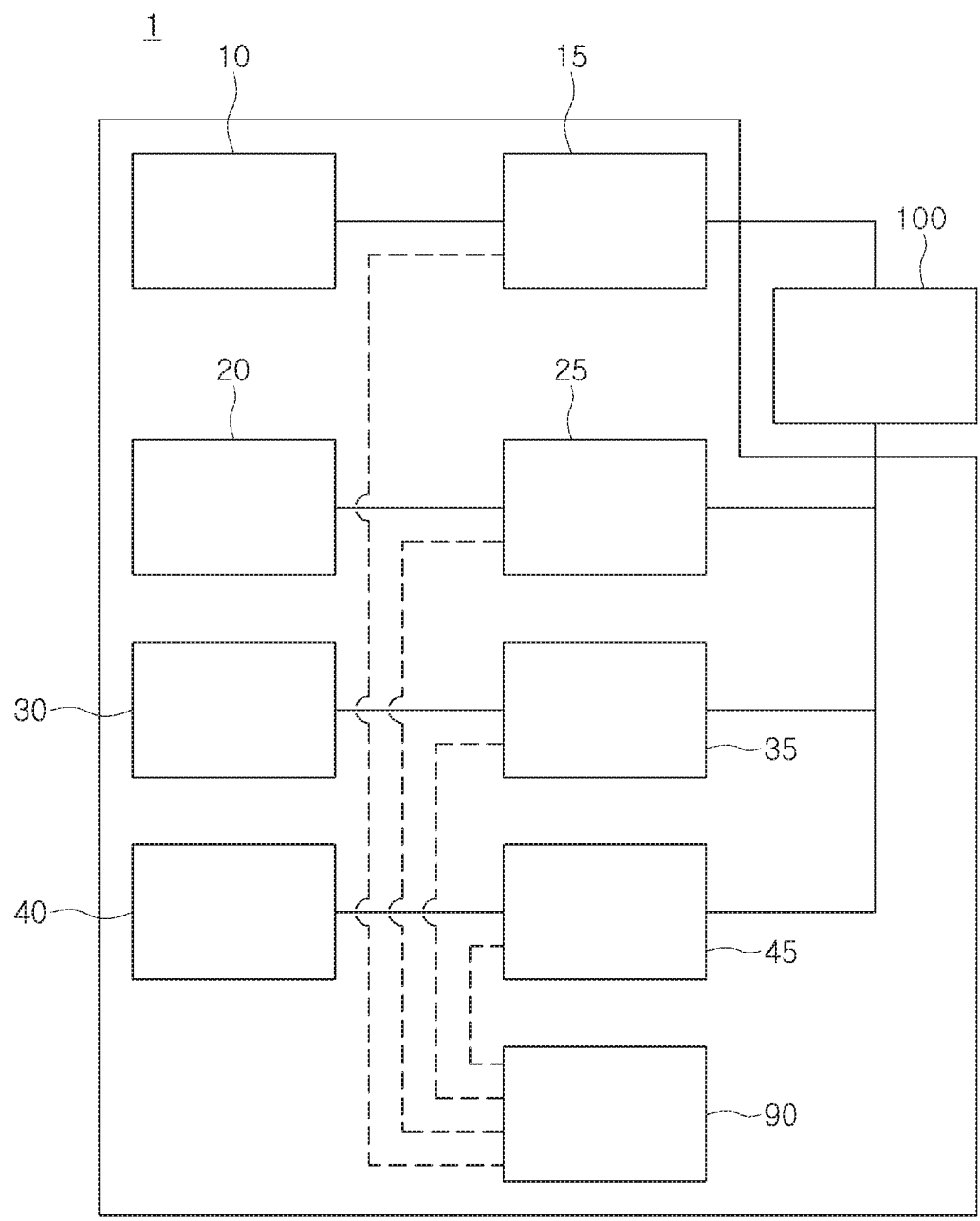
FIG. 2 is a schematic view illustrating an oral care device according to another embodiment of the present disclosure.

FIGS. 1 and 2 are schematic views illustrating an oral care device according to an embodiment and another embodiment of the present disclosure.

An oral care device 1 of the present disclosure includes: a care unit 100 configured to be inserted into the oral cavity of a user to have an effect on the teeth or gums of the user; and a main body connected to the care unit 100 for supplying liquid/gas to the care unit 100 or discharging liquid/gas from the care unit 100.

Referring to FIG. 1, the oral care device 1 includes: a liquid supply unit 20; the care unit 100 connected to the liquid supply unit 20 and having a spatial portion 140 (refer to FIG. 4) capable of accommodating at least one of an upper tooth side and a lower tooth side when the care unit 100 is inserted into the oral cavity; a suction unit 15 connected to the care unit 100 to supply liquid to the spatial portion 140 by suctioning liquid from the liquid supply unit 20 and to suction the liquid from the spatial portion 140; a discharge unit 10 connected to the suction unit 15 and configured to store or discharge liquid suctioned from the spatial portion 140; and an external connection path 30 through which the care unit 100 communicates with the outside.

A liquid control unit 25 and an air control unit 35 are respectively connected to the liquid supply unit 20 and the external connection path 30 such that when suction force of the suction unit 15 is applied to the care unit 100, the introduction of liquid or gas into the care unit 100 may be controlled. In this case, the liquid control unit 25 and the air control unit 35 may be constituted by separate solenoid valves. However, this is a non-limiting example. For example, the liquid control unit 25 and the air control unit 35 may be provided as a single member capable of controlling liquid and air.

In the oral care device 1, the suction unit 15, the liquid control unit 25, and the air control unit 35 may be connected to a control unit 90, and the control unit 90 may control the suction unit 15, the liquid control unit 25, and the air control unit 35 according to a signal input through a user input device (not shown) so as to pass liquid, air, or a mixture of liquid and air through the oral care device 1 while deforming the care unit 100 with negative pressure.

According to another embodiment shown in FIG. 2, the oral care device 1 includes: a liquid supply unit 20; a care unit 100 connected to the liquid supply unit 20 and having a spatial portion 140 (refer to FIG. 4) capable of accommodating at least one of an upper-teeth side and a lower-teeth side when the care unit 100 is inserted into the oral cavity; a suction unit 15 connected to the care unit 100 to supply liquid to the spatial portion 140 by suctioning liquid from the liquid supply unit 20 and to suction the liquid from the spatial portion 140; a discharge unit 10 connected to the suction unit 15 and configured to store or discharge liquid suctioned from the spatial portion 140; an external connection path 30 through which the care unit 100 communicate with the outside; and an additional ingredient supply unit 40 configured to supply an ingredient different from liquid of the liquid supply unit 20.

A liquid control unit 25, an air control unit 35, and an additional ingredient control unit 45 are respectively connected to the liquid supply unit 20, the external connection path 30, and the additional ingredient supply unit 40 such that when suction force of the suction unit 15 is applied to the care unit 100, the introduction of liquid, an additional ingredient, or air into the care unit 100 may be controlled.

In the oral care device 1, the suction unit 15, the liquid control unit 25, the air control unit 35, and the additional ingredient control unit 45 may be connected to a control unit 90, and the control unit 90 may control the suction unit 15, the liquid control unit 25, the air control unit 35, and the additional ingredient control unit 45 according to a signal input through a user input device (not shown) so as to pass liquid/an additional ingredient, air, or a mixture of liquid and air through the oral care device 1 while deforming the care unit 100 with negative pressure.

A liquid and an additional ingredient different from the liquid may be used. For example, one of the liquid and the additional ingredient may be water for cleaning, and the other may be a substance having an intended effect on teeth or gums such as an antimicrobial agent. In addition, particles may be added to the liquid or the additional ingredient.

According to the present disclosure, the care unit 100 is connected to the suction unit 15, and only the suction unit 15 suctions an ingredient from the liquid supply unit 20 or the additional ingredient supply unit 40 or a fluid through the external connection path 30. Therefore, to supply liquid to the care unit 100, it is required to place the care unit 100 in the oral cavity and maintain the care unit 100 in a sealed state to enable the suction unit 15 to suction liquid or an additional ingredient from the liquid supply unit 20 or the additional ingredient supply unit 40. In particular, when suction force is continuously applied to the care unit 100, sealing may be maintained according to the concept of a neutral zone.

Therefore, liquid may not leak from the care unit 100, and effects of the present disclosure on teeth or gums may be provided for persons such as infants, toddlers, or patients who are not experienced with or have difficult in controlling their body.

Furthermore, in the present disclosure, the discharge unit 10 may have an empty bin or a structure with a discharge outlet allowing for continuous discharge. When liquid passing through the care unit 100 is collected in the discharge unit 10, substances coming along with the liquid passing through the care unit 100 may also be collected in the discharge unit 10, and the substances may be analyzed to obtain information about the oral cavity or diagnose disease. That is, the oral care device 1 of the present disclosure may be used not only to provide effects on teeth, but also to detect the state of teeth or the oral cavity so as to obtain information to be used to select effects to be provided.

Figure 3:
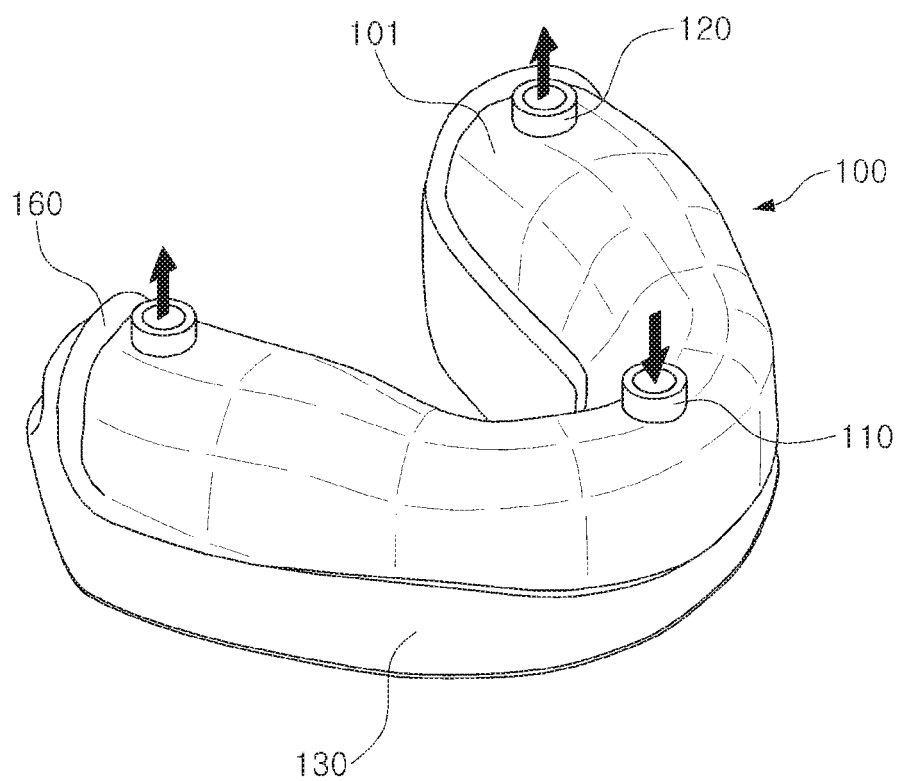
FIG. 3 is a perspective view illustrating a care unit of the oral care device according to the present disclosure.
Figure 4:
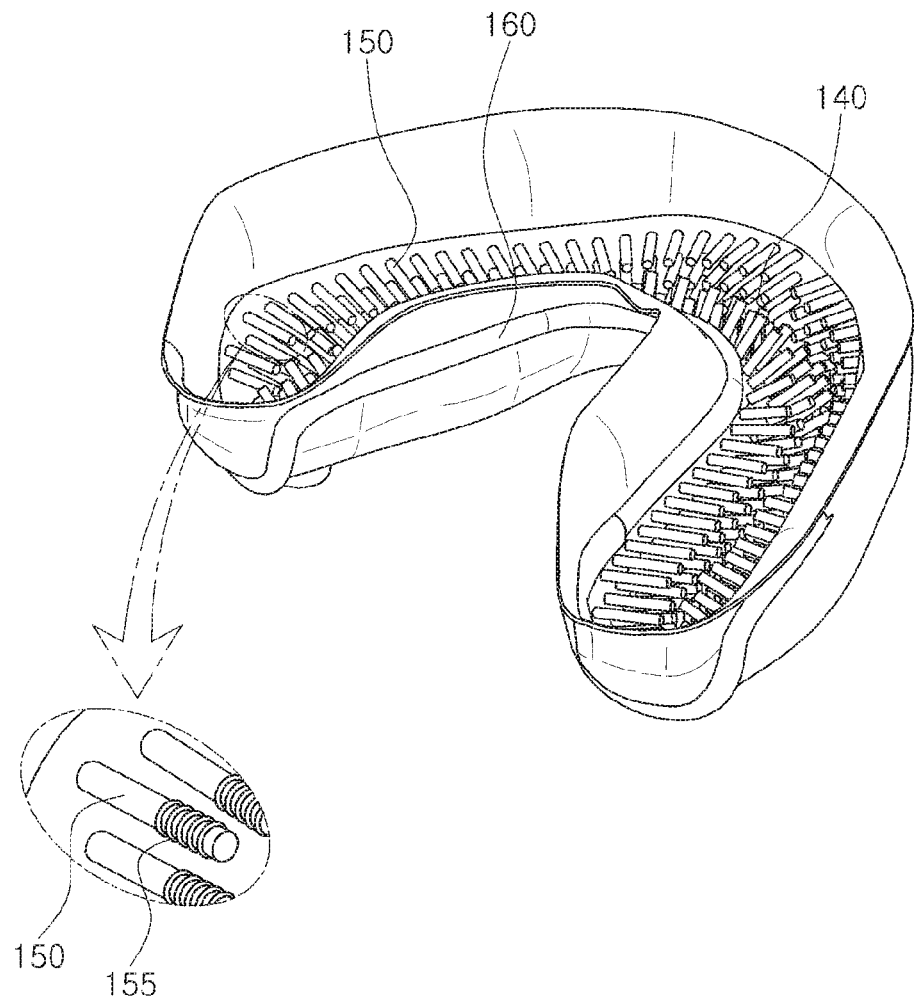
FIG. 4 is a bottom perspective view illustrating the care unit of the oral care device according to the present disclosure.

FIGS. 3 and 4 are perspective views illustrating an embodiment of the care unit 100 of the oral care device 1 shown in FIGS. 1 and 2, while FIGS. 5A to 8 are cross-sectional views illustrating mounted states of the care unit 100.

As illustrated in FIGS. 3 and 4, a fluid inlet 110 and fluid outlets 120 are formed in the care unit 100 to introduce liquid or air (gas) and allow the liquid introduced through the fluid inlet 110 to flow outwards after passing through the spatial portion 140. The care unit 100 includes: an outer wall 101 forming the spatial portion 140; a sealing portion 130 connected to the outer wall 101 for sealing the spatial portion 140 together with the outer wall 101 when the care unit 100 is fitted; and a connection portion 160 connecting the sealing portion 130 and the outer wall 101 to each other.

In a vertical cross section of the sealing portion 130, a center portion may have a slender shape, narrower than a lateral end portion of the connection portion 160 or an opened end portion. For example, the cross-sectional shape of the sealing portion 130 may have a semicircular shape. In this case, insertion may be easily performed, and a plurality of protrusions 150 may be arranged in the spatial portion 140.

In addition, the connection portion 160 may be formed of a material thicker or more rigid than that of the outer wall 101 or the sealing portion 130 so as to maintain the shape of the care unit 100 and ensure the strength of the care unit 100. In addition, a frame structure may be added to the same material to guarantee rigidity.

The connection portion 160 is formed along an outer surface of the care unit 100 except for rear sides of the care unit 100. Although the connection portion 160 is not formed along the rear sides of the care unit 100, inner and outer connection portions are connected to each other at an upper surface of the care unit 100 before the rear sides of the care unit 100. Since the upper and lower jaws of users are significantly different at the rear side of the care unit 100, the connection portion 160 providing rigidity may not be formed on the rear sides of the care unit 100, but the sealing portion 130 may only be provided on the rear sides of the care unit 100.

Overall, the care unit 100 has a mouthpiece shape, and the outer wall 101 has an opened side such that teeth may be inserted therethrough. That is, overall, the outer wall 101 has a E-shaped cross-section. The protrusions 150 are formed on an inner surface of the outer wall 101. The protrusions 150 and the outer wall 101 may be formed of the same material or different materials.

Basically, the outer wall 101 and the protrusions 150 may be formed of a soluble material. In addition, the outer wall 101 and the protrusions 150 may be formed of a soft material not causing discomfort, such as silicone or silicone rubber, and bristles may be provided as the protrusions 150.

Since the sealing portion 130 is connected to the outer wall 101 and is not provided with the protrusions 150, the sealing portion 130 may be formed on an opened-side end portion of the outer wall 101 or a distal end portion (a portion contacting innermost gums in the oral cavity) of the outer wall 101, and the sealing portion 130 may be formed of a material thinner or softer than that of the outer wall 101. The sealing portion 130 may include a cut portion for smooth sealing and for being commonly used for the upper and lower jaws. The cut portion may include: small/large cut lines on inner and outer sides of a front portion (a lip side) of the care unit 100 and a rear portion (an innermost side in the oral cavity) of the care unit 100; and a rear molar cut line. A plurality of cut portions may be formed on the sealing portion 130 along the periphery of the care unit 100 such that the sealing portion 130 may be smoothly deformed according to various dentitions. The cut portion may be formed from a free end of the sealing portion 130 toward the connection portion 160 in a direction perpendicular to the connection portion 160, and the width of the cut portion may increase in a direction toward the free end.

The protrusions 150 protrude mainly in a region making contact with teeth. The protrusions 150 may be distributed on an inner side of the outer wall 101. As illustrated in FIG. 4, uneven portions 155 may be formed on the protrusions 150. The uneven portions 155 may be formed in a threaded shape on the protrusions 150. However, the uneven portions 155 may have other shapes.

An operation of the oral care device 1 will now be described with reference to FIGS. 5 and 6. According to the present disclosure, since fluid (liquid/gas) is moved in the oral care device 1 only by suction force of the suction unit 15, if the control unit 90 operates the suction unit 15 after teeth T and gums Q are fitted into the spatial portion 140 of the care unit 100 having a mouthpiece shape, suction force is applied to the spatial portion 140 of the care unit 100, thereby suctioning air from the spatial portion 140 to the suction unit 15 and bringing the sealing portion 130 into tight contact with the gums Q for sealing the spatial portion 140.

In a state in which the spatial portion 140 is sealed and the liquid control unit 25 is opened, liquid is suctioned from the liquid supply unit 20 into the spatial portion 140 by suction force applied to the spatial portion 140, and thus the liquid is introduced to the spatial portion 140. Thereafter, if the liquid control unit 25 blocks supply of liquid and the air control unit 35 blocks supply of air, negative pressure is applied to the spatial portion 140 by the suction unit 15, and owing to a pressure difference between the inside and outside of the spatial portion 140, the outer wall 101 is deformed and brought into tight contact with the teeth T (refer to FIGS. 5B and 6B: a negative pressure forming operation).

At this time, the protrusions 150 formed on the outer wall 101 physically scrape foreign substances and bacteria off the teeth T while being moved along the surfaces of the teeth T.

Figure 5A:
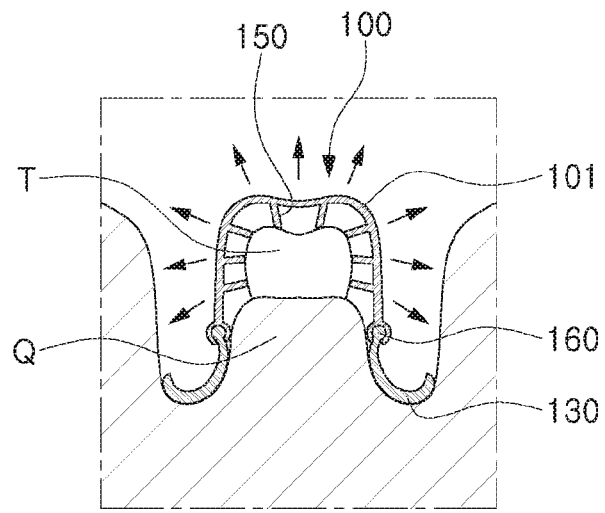
FIGS. 5A and 5B are vertical cross-sectional views illustrating operations of the care unit shown in FIGS. 3 and 4 after the care unit is placed in the oral cavity.
Figure 5B:
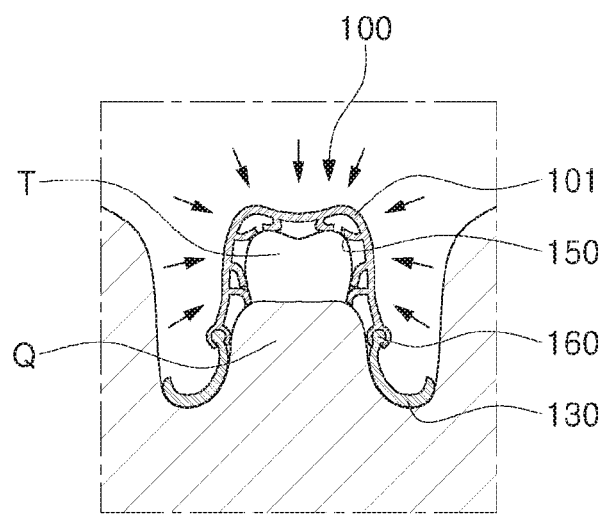
Figure 6A:
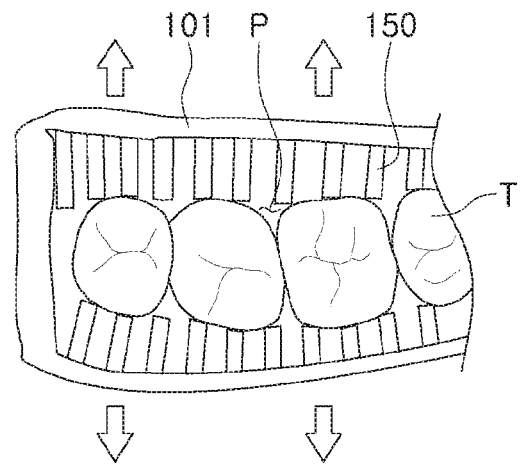
FIGS. 6A and 6B are horizontal cross-sectional views illustrating operations of the care unit shown in FIGS. 3 and 4 after the care unit is placed in the oral cavity.
Figure 6B:
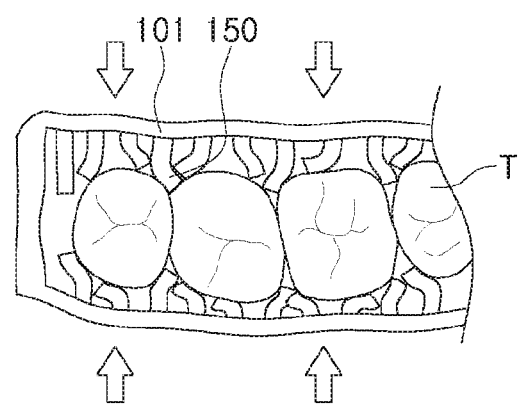

Thereafter, if the air control unit 35 opens the external connection path 30, the inside pressure of the spatial portion 140 becomes equal to atmospheric pressure, and thus the outer wall 101 deformed by the negative pressure formed in the spatial portion 140 returns to the original shape thereof (refer to FIGS. 5A and 6A: negative pressure removing operation). At this time, the protrusions 150 formed on the outer wall 101 also physically scrape foreign substances and bacteria off the teeth T while being moved along the surfaces of the teeth T.

If the air control unit 35 is repeatedly opened/closed in a state in which the suction unit 15 is continuously operated, negative pressure is repeatedly formed in/removed from the spatial portion 140, and thus the outer wall 101 is repeatedly moved. Therefore, the protrusions 150 formed on the outer wall 101 may be repeatedly moved along the surfaces of the teeth T, and thus the surfaces of the teeth T may be wiped. In addition, even when the liquid control unit 25 and the air control unit 35 are alternatively closed, the outer wall 101 may be repeatedly deformed, and thus the protrusions 150 may wipe the surfaces of the teeth T while being moved along the surfaces of the teeth T.

In the case in which the additional ingredient supply unit 40 is provided as illustrated in FIG. 2, the air control unit 35 is operated after liquid and an additional ingredient, which is not water, are supplied to the spatial portion 140, and liquid or the additional ingredient is supplied again to the spatial portion 140 after the air control unit 35 is opened/closed several times. Then, the air control unit 35 is repeatedly opened/closed. After a series of these operations, water is finally supplied and suctioned.

The repetition of liquid supply and opening/closing of the air control unit 35 has the same effect on the teeth T as toothbrushing and may be more effective than the case of simply supplying water.

Figure 7:
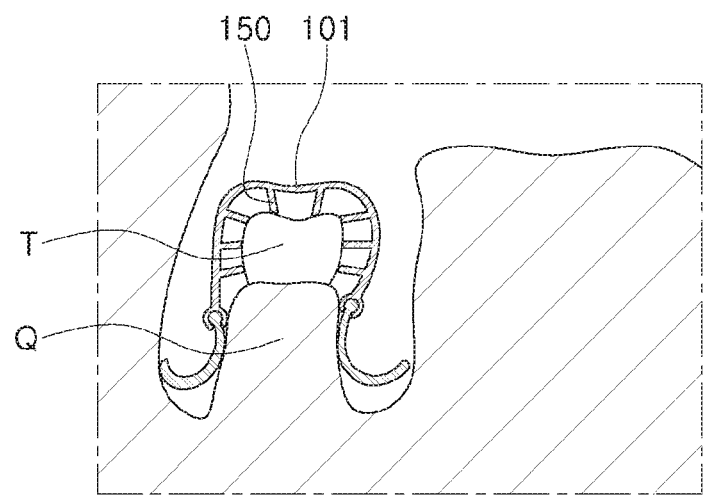
FIGS. 7 and 8 are vertical cross-sectional views illustrating the care unit shown in FIGS. 3 and 4, according to mounting positions.
Figure 8:
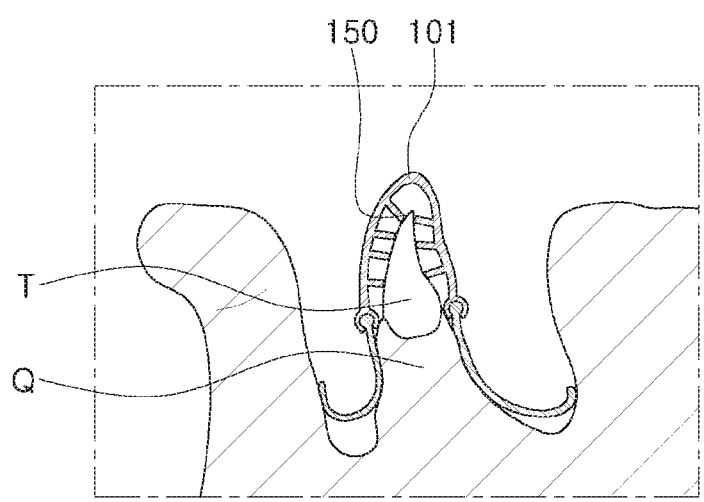

FIGS. 7 and 8 illustrate the oral care device 1 of the present disclosure in a fitted state. As illustrated in FIGS. 7 and 8, the spatial portion 140 is sealed because the sealing portion 130 is in tight contact with gums Q over regions of incisors and molars, and thus the protrusions 150 formed on the outer wall 101 may scrape the surfaces of the teeth T and clean the teeth T.

For example, the protrusions 150 may protrude toward the gums Q, and in this case, the protrusions 150 may have a massaging effect on the gums Q.

Figure 9:
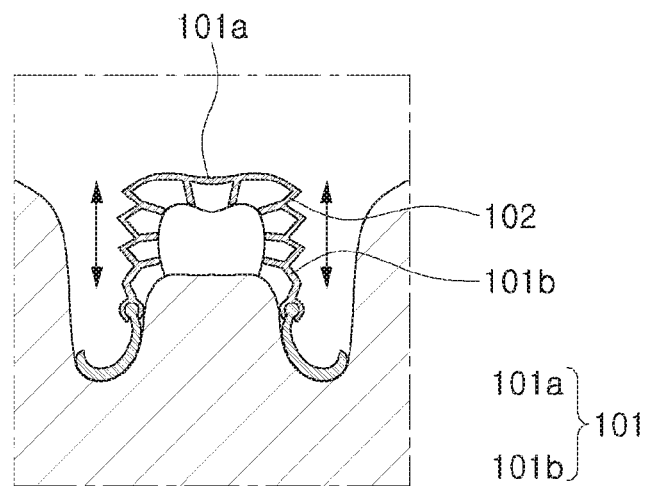
FIG. 9 illustrates another embodiment of the care unit of the oral care device.

FIG. 9 illustrates another embodiment of the care unit 100. As illustrated in FIG. 9, an upper outer surface 101a of the outer wall 101 of the care unit 100 has the same structure as that illustrated in FIGS. 7 and 8. However, a lateral outer wall 101b includes bent portions 102 having a folded structure. In the present embodiment, the bent portions 102 are formed on the lateral outer wall 101b. However, the bent portions 102 may be formed on the upper outer surface 101a.

In the present embodiment in which the bent portions 102 are formed on the outer wall 101, the outer wall 101 is deformed mainly at the bent portions 102 when negative pressure is applied to the outer wall 101, the shape of the outer wall 101 making tight contact with teeth T may thus be controlled in a predetermined direction. This allows the protrusions 150 to scrape the teeth T in a particular direction when the outer wall 101 is deformed.

In general, teeth T have a region in which, although toothbrushing is insufficient, dental caries do not easily occur, owing to self cleaning by friction between the tongue and mucous membranes of cheeks and lips, a region in which foreign substances are caught, and a region in which dental caries easily occur. Thus, the bent portions 102 may be configured such that the outer wall 101 may be deformed mainly in regions between the teeth T or grooves in upper surfaces of the teeth T.

Alternatively, grooves thinner than the outer wall 101 may be formed instead of the bent portions 102 to induce deformation.

Figure 10:
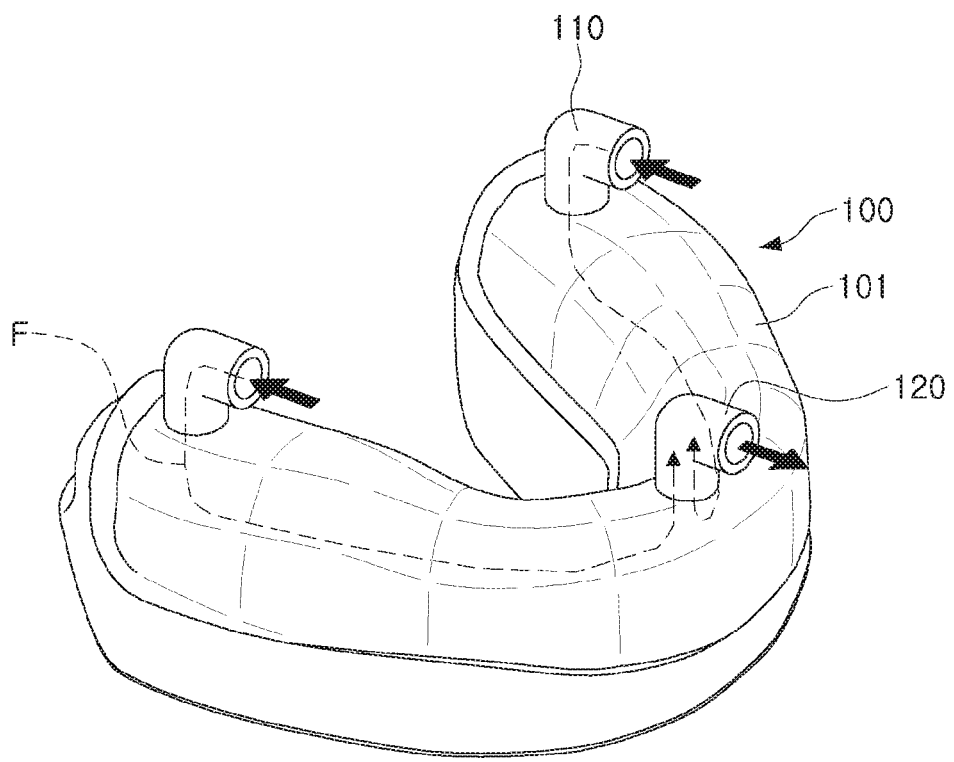
FIG. 10 is a perspective view illustrating an arrangement of a fluid inlet and a fluid outlet of the care unit of the oral care device according to an embodiment.
Figure 11:
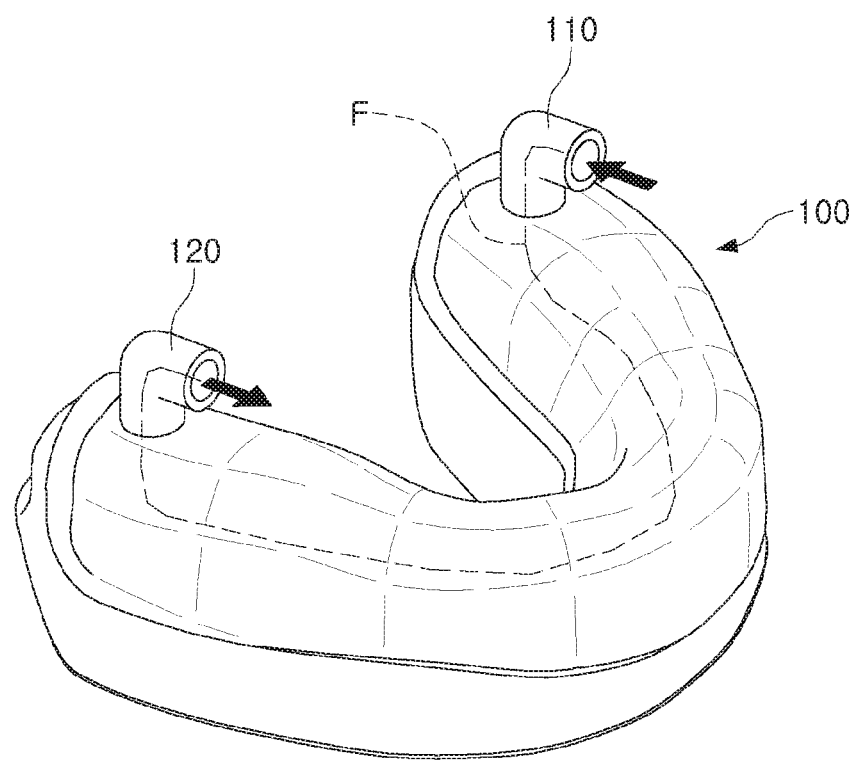
FIG. 11 is a perspective view illustrating another embodiment of the fluid inlet and outlet arrangement of the care unit of the oral care device.
Figure 12:
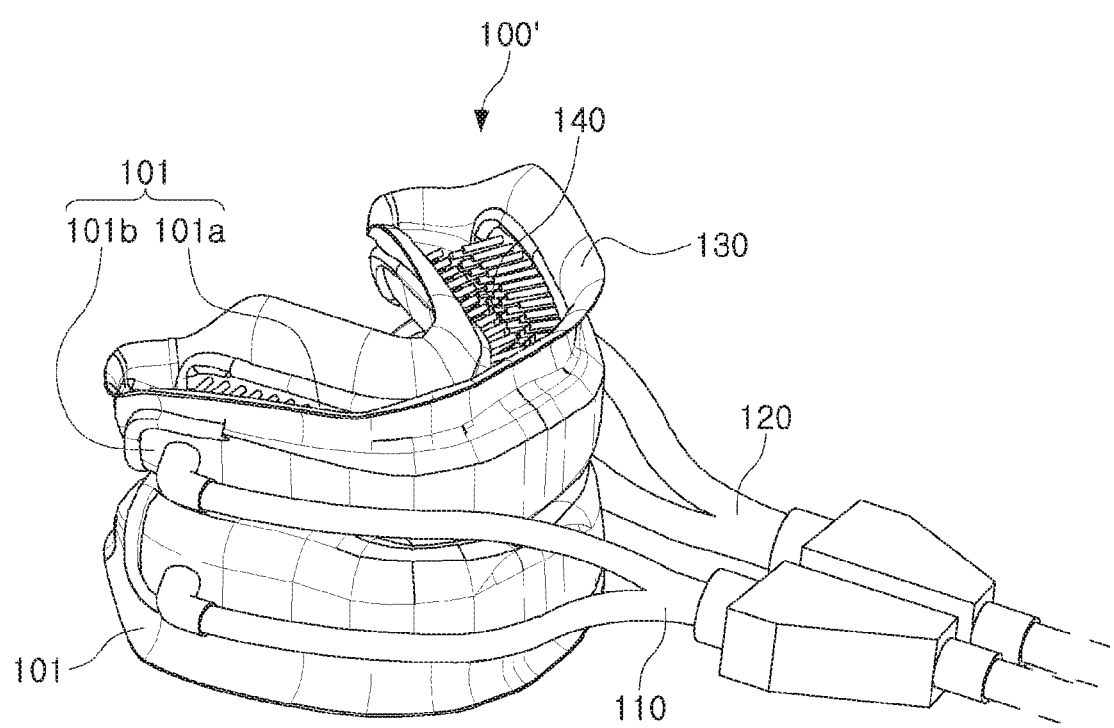
FIG. 12 is a perspective view illustrating another embodiment of the care unit of the oral care device.

FIGS. 10 to 12 illustrate another embodiment of the care unit 100 of the present disclosure.

Referring to FIG. 10, the care unit 100 has a mouthpiece shape, and fluid inlets 110 are separately provided at rear sides (innermost side in the oral cavity) of the care unit 100 to form fluid flows F from the inner side to the outer side (lip side) of the oral cavity. In this case, although two fluid inlets 110 are respectively located at both the rear sides, only one fluid outlet 120 is provided in a center position. However, the fluid inlets and outlet may be changed to form fluid flows from the outside to the inner side of the oral cavity.

FIG. 11 illustrates another embodiment in which a fluid inlet 110 is provided at a rear side of the care unit 100, and a fluid outlet 120 is provided at the other rear side of the care unit 100. In this case, a fluid may flow along a rear side, an outer side, and the other rear side across the entire region of teeth.

Referring to FIG. 12, care units 100' are arranged in a vertically symmetrical manner so as to care for both the upper and lower teeth at the same time. In this case, fluid inlets 110 and fluid outlets 120 are connected to lateral outer walls 101b of outer walls 101 instead of being connected to upper outer walls 101a of the outer walls 101. In the present embodiment, both the upper and lower teeth may be cared at the same time, and thus the care time may be reduced. In the present embodiment, the fluid inlets 110 and the fluid outlets 120 are provided at lateral sides of molar sides (rear sides) of the upper and lower jaws, and upper and lower jaw spatial portions 140 are opened at incisor positions. On the contrary, fluid inlets 110 and fluid outlets 120 may be provided at incisor sides (front sides) of the upper and low jaws, and upper and low jaw spatial portions 140 may be opened at molar positions.

Although FIG. 12 illustrates a vertically symmetrical structure, fluid may be introduced through an upper side and discharged through a lower side, or may be introduced through a lower side and discharged through an upper side.

The care units 100' illustrated in FIG. 12 may be provided by joining or attaching such care units 100 as that shown in FIG. 11 to each other, or may be provided in one piece.

Figure 13:
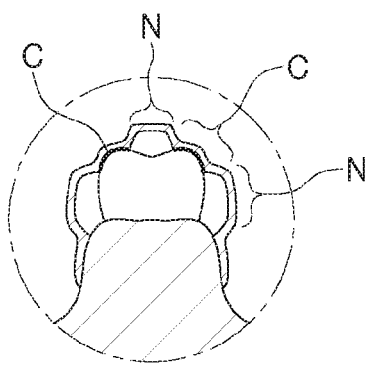
FIG. 13 is a vertical cross-sectional view illustrating a mounting structure of the care unit of the oral care device according to another embodiment of the present disclosure.
Figure 14:
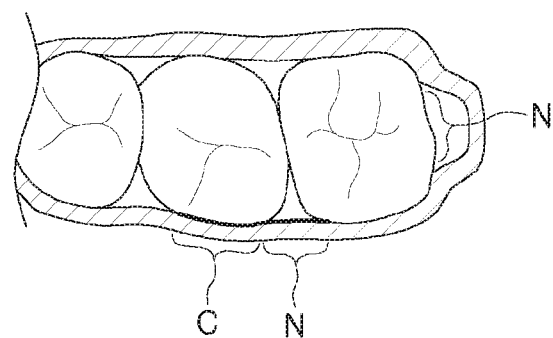
FIG. 14 is a horizontal cross-sectional view illustrating the mounting structure of the care unit shown in FIG. 13.

FIGS. 13 to 14 illustrate another embodiment of the care unit 100 of the present disclosure.

As described above, foreign substances are not caught in all regions of teeth but are intensively caught in particular regions such as concave regions or groove regions.

In the embodiment shown in FIGS. 13 and 14, the spatial portion 140 is formed according to the shape of teeth T, and so as to allow fluid to flow mainly along regions in which foreign substances are caught, the spatial portion 140 includes a contact region C making contact with teeth and gums and a non-contact region N protruding outwardly from the contact region to allow liquid to flow. The outer wall 101 extends to gum regions and makes tight contact with the gum regions, thereby preventing the leakage of fluid. In the embodiment shown in FIGS. 13 and 14, protrusions 150 (refer to FIG. 4) are not formed. However, protrusions 150 may be selectively formed only in the non-contact region N.

The flow velocity of fluid varies according to the size of a space between the outer wall 101 and the teeth or gums. If the space between the outer wall 101 and the teeth or gums is large, the flow velocity of fluid may be reduced, and if the space is small, the flow velocity of fluid may be increased. When the flow velocity of fluid is high, foreign substances are more effectively removed.

In the embodiment shown in FIGS. 13 and 14, the outer wall 101 is configured such that the non-contact region N through which liquid flows is formed in regions in which foreign substances are often caught, and the contact region C making contact with teeth or gums is formed in regions in which foreign substances are not easily caught. Therefore, since regions through which liquid flows are limited, liquid may flow only in regions requiring rapid flows. In addition, the amount of cleaning liquid may be reduced, and the size of the liquid supply unit 20 may be reduced, thereby reducing the total size of the oral care device 1.

In the embodiment shown in FIGS. 13 and 14, the care unit 100 may be customized according to the oral structure of a user so as to exactly form the contact region C and the non-contact region N.

Figure 15:
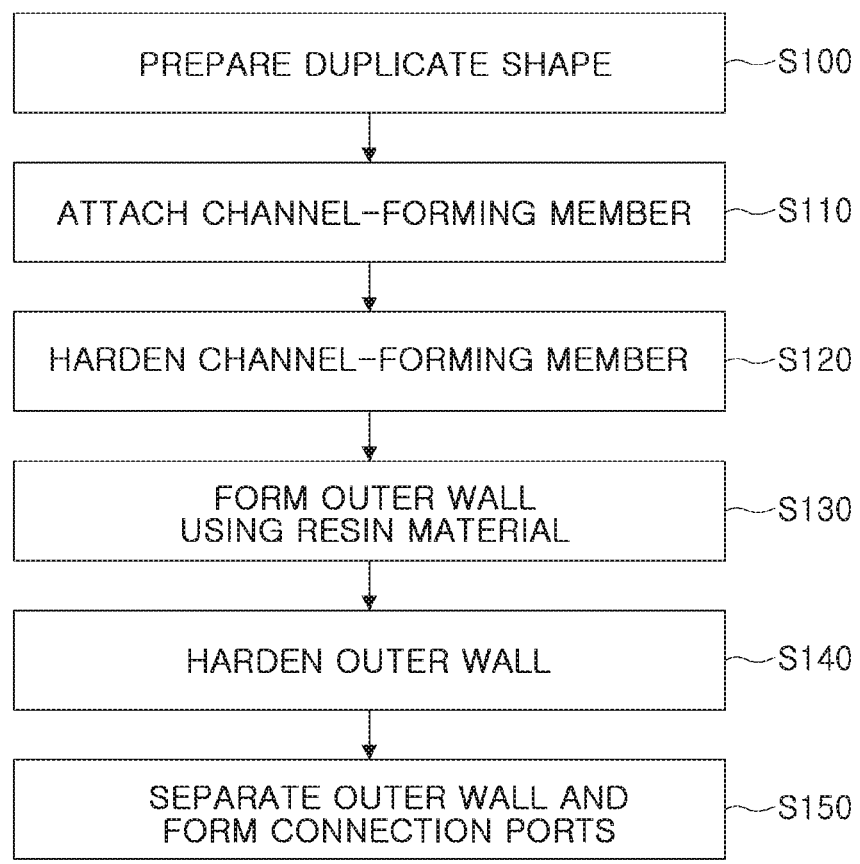
FIG. 15 is a flowchart illustrating a method of fabricating a customized care unit according to the embodiment described with reference to FIGS. 13 and 14.

FIG. 15 is a flowchart illustrating a method of fabricating a customized care unit according to the embodiment described with reference to FIGS. 13 and 14.

The customized care unit may be fabricated through a duplicate shape preparing operation S100 in which the shape of a user's teeth is obtained; a channel-forming member attachment operation S110 in which a channel-forming member is attached to the duplicate shape; a channel-forming member hardening operation S120 in which the channel-forming member attached to the duplicate shape is hardened; an outer wall forming operation S130 in which a resin material is applied to the duplicate shape to which the channel-forming member is attached; an outer wall hardening operation S140 in which the resin material applied to the duplicate shape is hardened; and an outer wall separating operation S150 in which the outer wall is separated, wherein connection ports such as a fluid inlet or a fluid outlet may be formed during or before the outer wall separating operation S150.

In detail, the duplicate shape preparing operation S100 is performed by a method used in the dental field to prepare the same shape as the shape of a user's teeth. Here, the shape of teeth refers to not only the shape of teeth but also to the shape of gums connected to the teeth. A method of preparing a duplicate shape is not limited. In addition, the following operations may be performed on a user's teeth without preparing a duplicate shape.

Although the present embodiment is provided mainly for humans (users), the present disclosure may be applied to mammals, such as dogs or cats, as described above.

Figure 16:
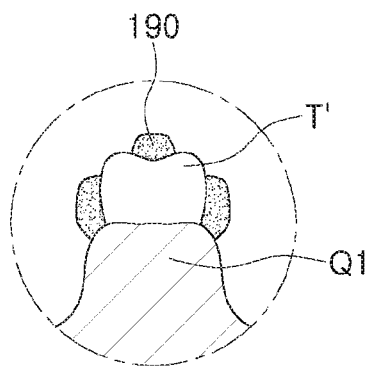
FIG. 16 is a schematic view illustrating a channel-forming member attachment operation in the flowchart of FIG. 15.

In the channel-forming member attachment operation S110, a light-cured resin paste is applied as the channel-forming member to the duplicate shape mainly in regions in which foreign substances will be easily caught. As shown in FIG. 16, since the channel-forming member denoted by reference numeral 190 will form a channel in the care unit, the channel-forming member 190 is formed over the entire region of teeth T' except for regions in which foreign substances are not easily caught owing to self cleaning by the mucous membrane or tongue in the oral cavity. For example, the channel-forming member 190 is mainly formed in boundary regions between gums Q1 and teeth T', gaps between teeth T', or grooves in occlusal surfaces of teeth T'.

In the channel-forming member hardening operation S120, the duplicate shape to which the channel-forming member 190 is attached is inserted into a light-curing device and irradiated with light to harden the channel-forming member 190. At this time, ports for forming fluid inlets or outlets may be attached to the hardened channel-forming member. However, such ports may be attached after an outer wall is formed on the channel-forming member.

In the present embodiment, a channel forming operation includes the channel-forming member attachment operation S110 and the channel-forming member hardening operation S120. However, in other embodiments, a channel may be formed using a channel-forming member without an additional hardening operation. For example, a channel may be formed of a self-polymerization material without an additional hardening operation, or a channel formed of a thermoplastic resin may be hardened.

In the outer wall forming operation S130, an outer wall may be formed by pressing a silicone material against the duplicate shape to which the channel-forming member 190 is attached and hardening the silicone material, or by pressing a softened resin material to a constant thickness. In the silicone pressing-hardening method, a silicone material is pressed against the duplicate shape to which the channel-forming member 190 is attached, and is then hardened by a general silicone hardening method. In the resin material pressing method, a thermoplastic sheet is placed on a vacuum processing machine and melted with heat, and a vacuum is formed to bring a resin material into tight contact with the duplicate shape to which the channel-forming member 190 is attached (refer to FIG. 17).

In the outer wall hardening operation S140, the resin material brought into tight contact with the duplicate shape is hardened by cooling the resin material by forced or natural cooling. According to the present embodiment, like in the previous channel forming operation, the outer wall is formed through the outer wall forming operation S130 and the outer wall hardening operation S140. However, according to the material of the outer wall, the outer wall may be formed through a single operation without an additional hardening operation.

The outer wall is separated from the duplicate shape in the outer wall separating operation S150. Ports for forming fluid inlets or outlets are formed in the separated outer wall. Alternatively, ports may be formed by forming port internal passages in the channel-forming member attachment operation S110 and the channel-forming member hardening operation S120, and forming outer walls of the ports in the outer wall forming operation S130 and the outer wall hardening operation S140.

Figure 17:
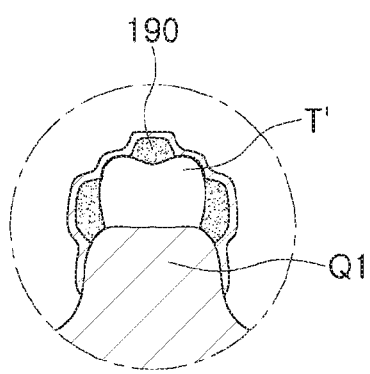
FIG. 17 is a schematic view illustrating an outer wall forming operation in the flowchart of FIG. 15.

The customized care unit fabricated as described with reference to FIGS. 15 to 17 has a shape corresponding to the shape of a user's teeth and provides rapid flows in regions in which foreign substances are easily caught while consuming a small amount of cleaning water, thereby making it easy to care for teeth. Particularly, according to the present disclosure, rapid fluid flows may be provided without using a fluid pressurizing device.

Although a customized mouthpiece structure for forming a channel with respect to a real object (teeth or a duplicate shape) and a method of fabricating the customized mouthpiece structure are described with reference to FIGS. 15 to 17, the customized care unit (mouthpiece) of the present disclosure may be designed using a computer.

The duplicate shape preparing operation S100 may be replaced with an information acquisition operation in which information about target teeth is obtained using an intraoral scanner (dental scanner) used in dental clinics, and the channel-forming member attachment operation S110 may be replaced with a channel addition operation in which information about a channel forming structure is added to the information about target teeth. That is, information about a shape equivalent to a duplicate shape to which a channel-forming member is attached may be obtained by adding information about a channel forming structure to the information about target teeth stored in a computer.

A duplicate shape of the target teeth may be fabricated based on the information by using a device such as a 3D printer, and the outer wall forming operation S130 to the outer wall separating operation S150 may be performed on the duplicate shape to fabricate a customized care unit.

Alternatively, information about an outer wall structure may be obtained using a computer from information (data) to which information about a channel forming structure is added, and an outer wall may be directly fabricated based on the outer wall structure information without forming a duplicate shape.

Figure 18A:
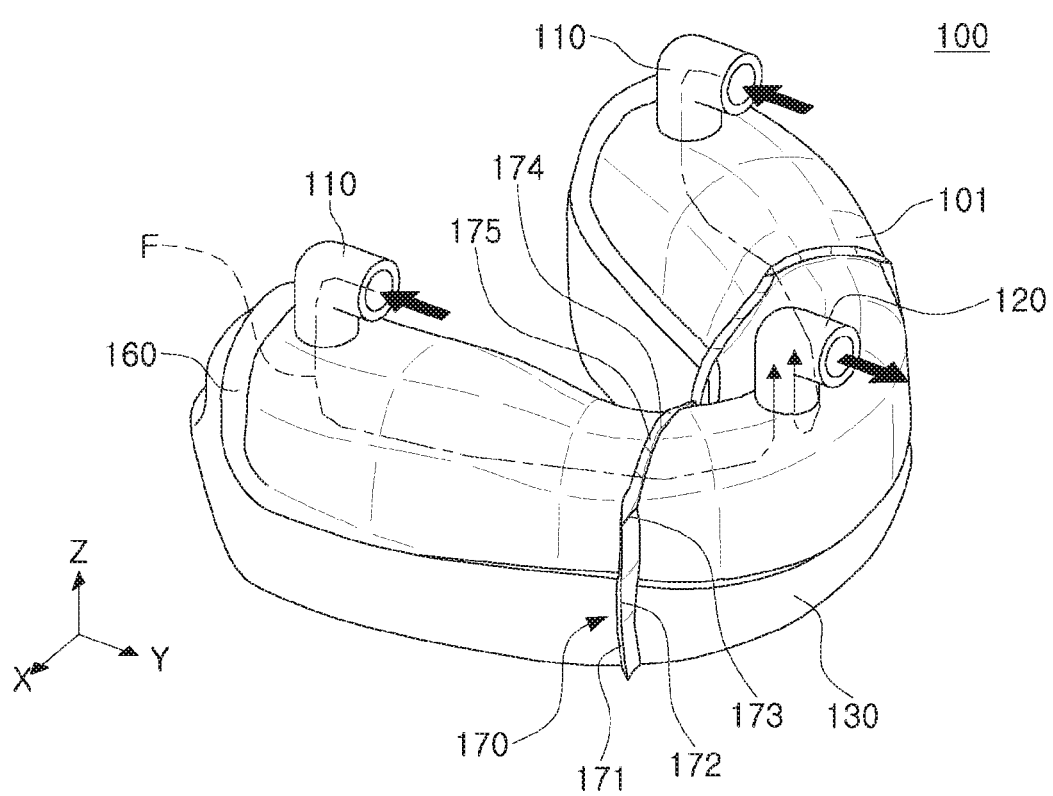
FIGS. 18A to 18C are perspective views illustrating another embodiment of the care unit, FIG. 18A illustrating a shrunk state, FIG. 18B illustrating a non-deformed state, and FIG. 18C illustrating an enlarged state.
Figure 18B:
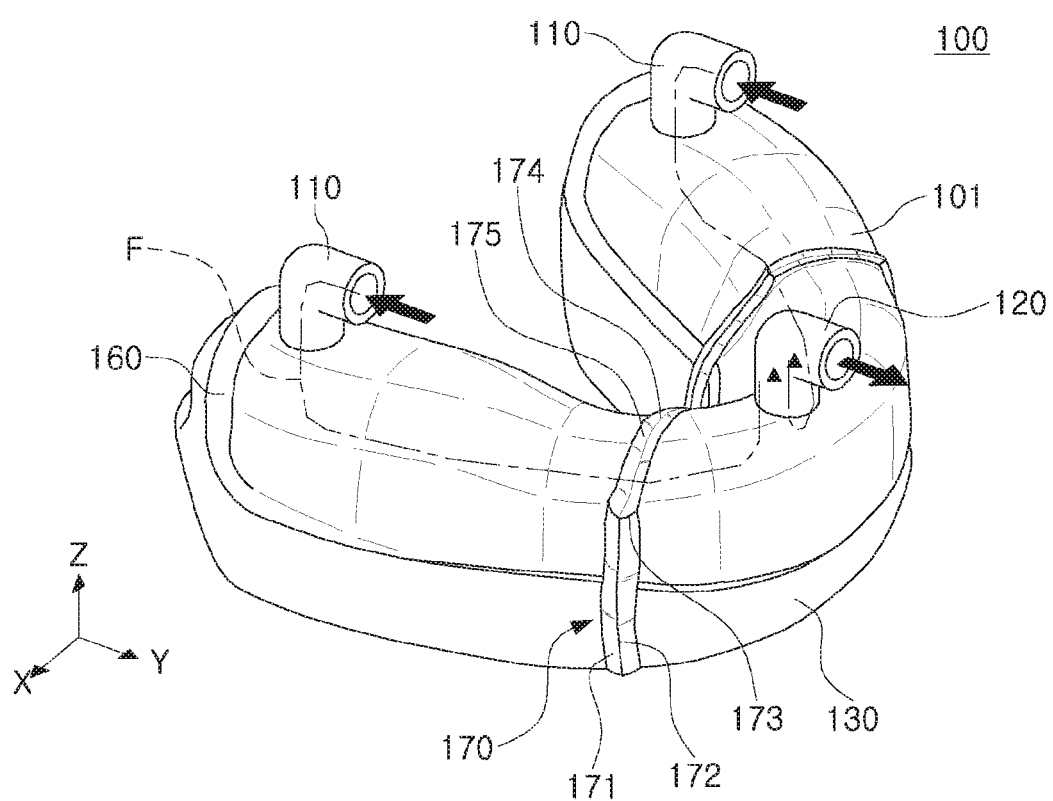
Figure 18C:
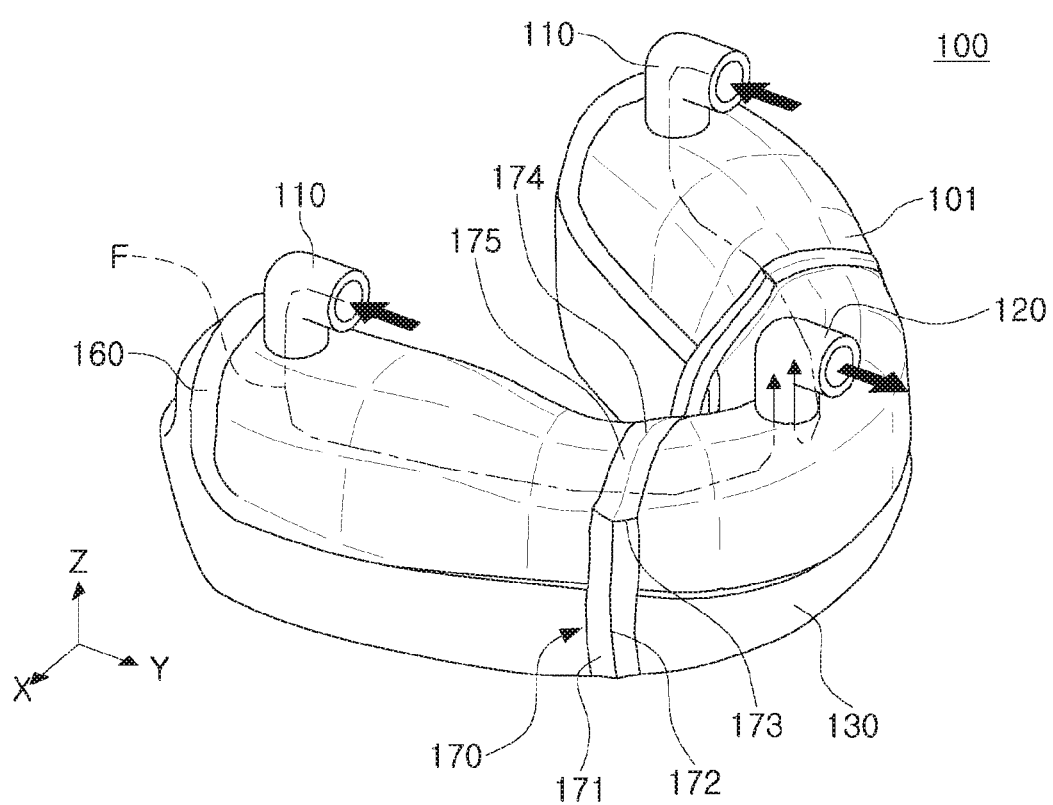
Figure 19A:
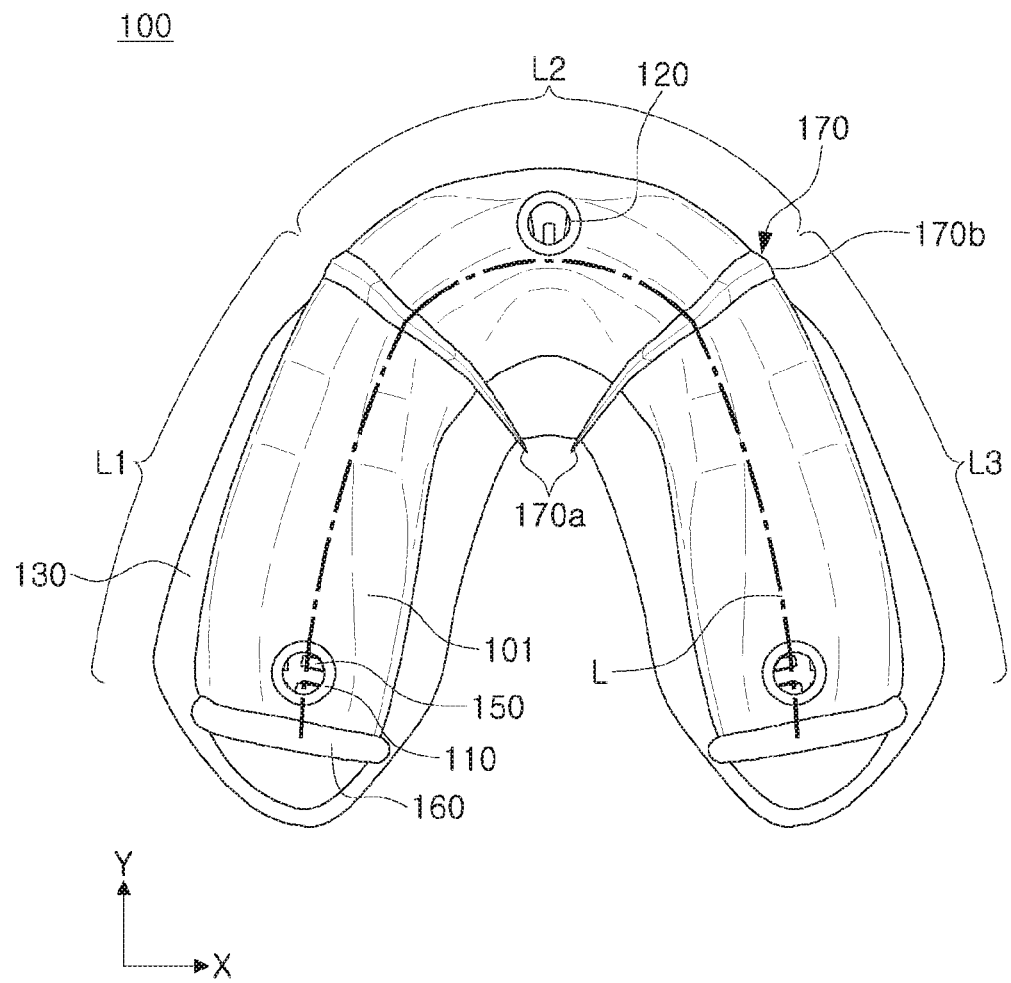
FIGS. 19A to 19C are plan views illustrating the care unit shown in FIGS. 18A to 18C, FIG. 19A illustrating an inwardly deformed state, FIG. 19B illustrating an outwardly spread state, and FIG. 19C illustrating a non-deformed state.
Figure 19B:
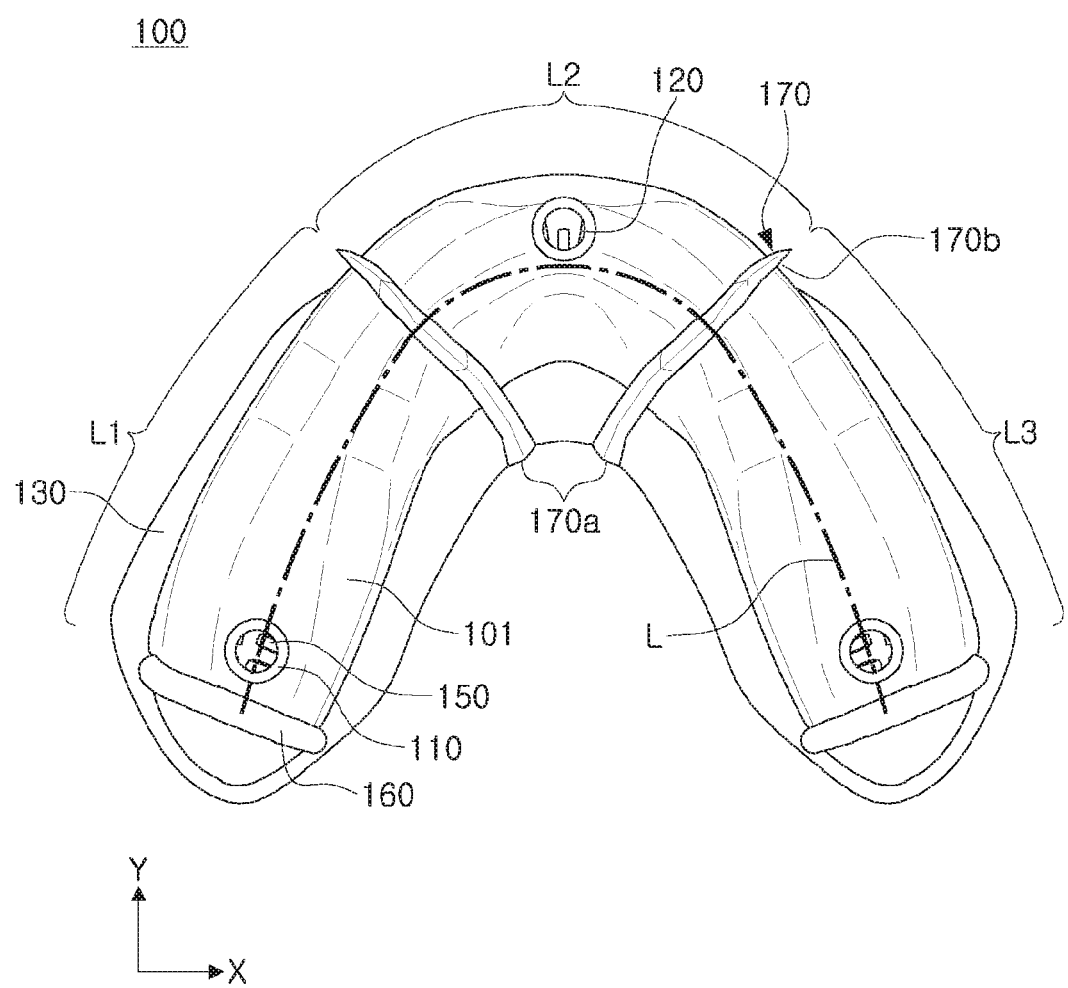
Figure 19C:
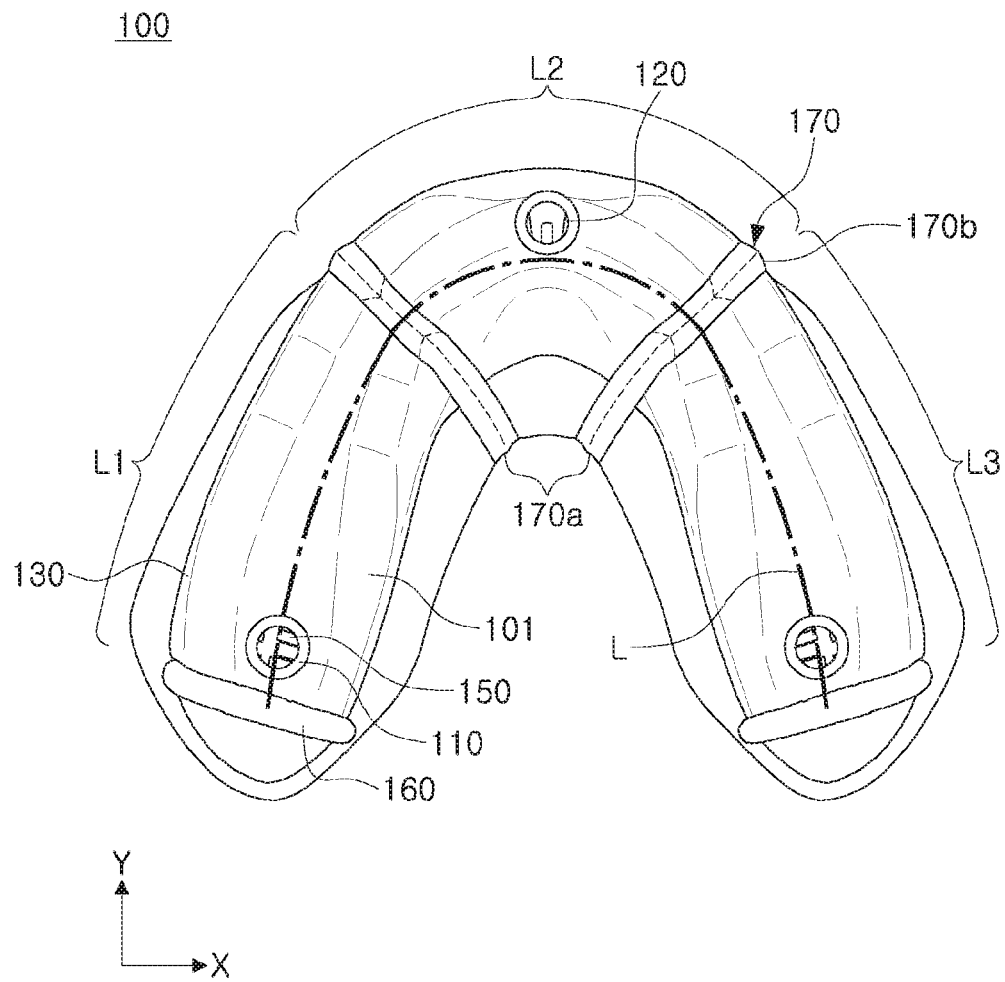

FIGS. 18A to 19C are perspective views and plan views illustrating another embodiment of the present disclosure, FIG. 18A illustrating a shrunk state, FIG. 18B illustrating a non-deformed state, FIG. 18C illustrating an enlarged state, and FIGS. 19A to 19C being plan views. FIGS. 18A to 26C illustrate embodiments of care units configured to be deformed by suction force and the structure of the oral cavity as well. Thus, the care units may also be called variable mouthpieces.

As shown in FIGS. 18A to 18C, in a care unit 100 being a variable mouthpiece, fluid inlets 110 are formed in an outer wall 101 to introduce liquid or air (gas), and a fluid outlet 120 is formed in the outer wall 101 to discharge liquid introduced through the fluid inlets 110 and having passed through a spatial portion 140 (refer to FIG. 4). The care unit 100 includes the outer wall 101 forming the spatial portion 140, a sealing portion 130 coupled to the outer wall 101 and configured to seal the spatial portion 140 together with gums when the care unit 100 is fitted, and a connection portion 160 connecting the sealing portion 130 and the outer wall 101 to each other.

In the embodiment shown in FIGS. 18A to 18C, the fluid inlets 110 are respectively formed in positions close to both end portions of the care unit 100 on an inner side of the oral cavity (inside in a Y-axis direction), and the fluid outlet 120 is formed in a center portion of the care unit 100 on an outer side of the oral cavity. However, the fluid inlets 110 and the fluid outlet 120 may be modified as illustrated in FIG. 3 or 11.

In addition, the connection portion 160 may be formed of a material thicker or more rigid than that of the outer wall 101 or the sealing portion 130 so as to maintain the shape of the care unit 100 and ensure the strength of the care unit 100. In addition, a frame structure may be added to the same material to guarantee rigidity. In the embodiment shown in FIGS. 18A to 18C, only the sealing portion 130 is formed on both ends portions of the care unit 100 in a length direction L (refer to FIG. 9).

As in the embodiment shown in FIG. 3, in the embodiment shown in FIGS. 18A to 19C, the care unit 100 has a mouthpiece shape overall, and the outer wall 101 has an opened side such that teeth may be inserted therethrough. That is, overall, the outer wall 101 has a E-shaped cross-section. A plurality of protrusions 150 are formed on an inner surface of the outer wall 101.

Unlike the embodiment shown in FIG. 3, according to the embodiment shown in FIGS. 18A to 19C, variable portions 170 are formed across the outer wall 101 and the sealing portion 130 in a direction crossing the length direction L of the care unit 100.

When a center side of the ⊏-shaped cross-section is referred to as a first side, and both lateral sides of the ⊏-shaped cross-section are referred to as second sides, the variable portions 170 include deformation inducing portions 171 to 175 such that portions of the variable portions 170 extending from the first side and portions of the variable portion 170 extending from the second sides may be deformed in different directions.

The deformation inducing portions 171 to 175 include: thin surfaces 171 and 175 thinner than the outer wall 101; and folding portions 172, 173, and 174 previously formed such that the thin surfaces 171 and 175 may easily be folded. The folding portions 174 on the first side are previously folded such that the outer wall 101 may be folded in a direction toward the spatial portion 140 (refer to FIG. 4), and the folding portions 172 on the second sides are previously folded such that the outer wall 101 may be folded in directions opposite the spatial portion 140. Owing to the folding portions 173, the surfaces 171 and 175 may be folded in opposite directions on the first and second sides.

The variable portions 170 are spaced apart from both end portions of the care unit 100 by a distance less than ½ of the length of the care unit 100 but equal to or greater than ¼ of the length of the care unit 100. When the variable portions 170 are spaced apart from both end portions of the care unit 100 by a distance less than ¼ of the length of the care unit 100, the variable portions 170 may be deformed only in a direction from the inside to the outside of the oral cavity (Y-axis direction in FIGS. 18A to 19C). However, when the variable portions 170 are spaced apart from both end portions of the care unit 100 by the above-mentioned length range, the variable portions 170 may also be deformed in a width direction of the oral cavity (X-axis direction in FIGS. 18A to 19C), and the care unit 100 may be used for various oral cavity shapes.

That is, as shown in FIG. 19A, if inner variable portions 170a are shrunk, and outer variable portions 170b are enlarged, both end portions of the care unit 100 may approach each other. In addition, as shown in FIG. 19C, if the inner variable portions 170a are enlarged, and the outer variable portions 170b are shrunk, both end portions of the care unit 100 may be spread.

In a general tooth arrangement, incisors are arranged in a semicircular shape in front of canines, and molars are arranged in a substantially straight shape behind the canines. Therefore, if the variable portions 170 are located in positions corresponding to the canines, the teeth may be arranged in a center portion of the spatial portion 140. Referring to FIGS. 19A to 19C, when distances L1 and L3 from both end portions to the variable portions 170 are equal to or 0.8 times to 1.2 times the distance L2 between the variable portions 170, the variable portions 170 may be located in positions corresponding to canines.

If the variable portions 170 are located in positions corresponding to canines as described above, teeth may be arranged in a center portion of the spatial portion 140, and thus the protrusions 150 may uniformly rub against inner and outer regions of the teeth while the outer wall 101 is repeatedly brought into contact with the teeth and separated form the teeth by a suction unit 15, thereby effectively caring for the teeth.

The variable portions 170 and the outer wall 101 may be formed of the same flexible material, but the variable portions 170 may be thinner than the outer wall 101 to be easily deformed. Alternatively, the variable portions 170 and the outer wall 101 may have the same thickness, but the variable portions 170 may be formed of a material more flexible than a material used for forming the outer wall 101.

In the embodiment shown in FIGS. 18A to 19C, the variable portions 170 are deformed in different directions along the first and second sides. However, in embodiments shown in FIGS. 20 and 21, variable portions 170' may be deformed only in one direction.

Figure 20:
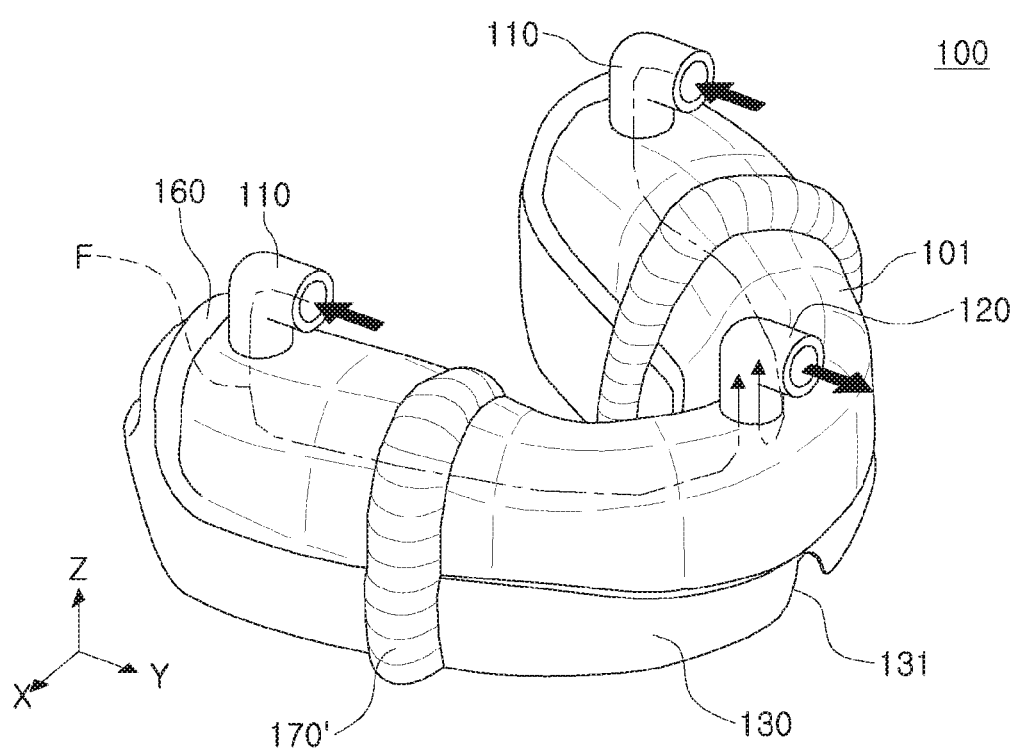
FIGS. 20 to 25 are perspective views illustrating other embodiments of the care unit.

The embodiment shown in FIG. 20 is basically the same as the embodiment shown in FIGS. 18A to 19C. In the embodiment shown in FIG. 20, however, variable portions 170' are formed across an outer wall 101 and a sealing portion 130 in a direction crossing the length direction L of a care unit 100, and the variable portions 170' has a convex shape such that variable portion may be deformed only in a direction away from the spatial portion 140 (refer to FIG. 4).

Furthermore, in the embodiment shown in FIG. 20, a recessed portion 131 in which the sealing portion 130 is reduced in width or does not exist is formed in a center outer side in the length direction of the care unit 100. The recessed portion 131 is provided as a space for accommodating the labial frenum or lingual frenum, such that the sealing portion 130 may not be lifted due to the labial frenum or lingual frenum, and thus sealing may be guaranteed. In addition, when the care unit 100 is shrunk by negative pressure, the labial frenum or lingual frenum may not be irritated, and thus pain may not be caused.

Figure 21:
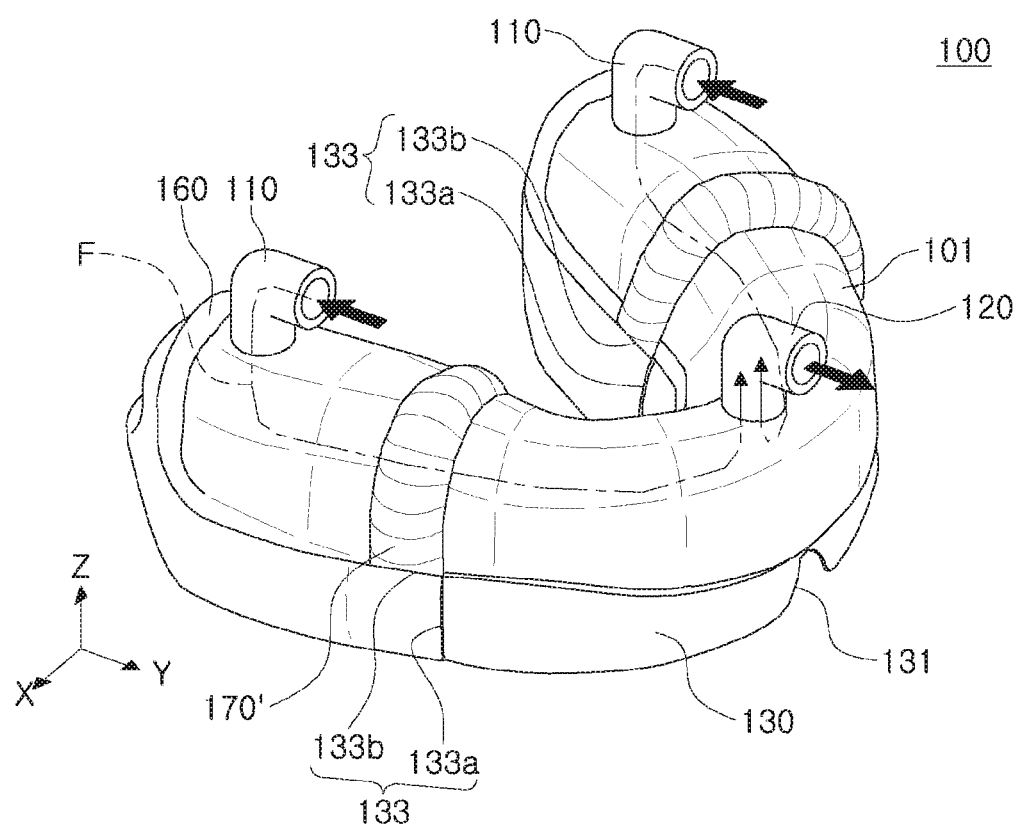

The embodiment shown in FIG. 21 is similar to the embodiment shown in FIG. 20. However, variable portions 170' are formed only on an outer wall 101, and cut portions 133 are formed on a sealing portion 130 in positions corresponding to the variable portions 170'. Each of the cut portions 133 includes: an upper cut portion 133b formed along an outer wall of the sealing portion 130 to have a width corresponding to the width of the variable portion 170'; and a lateral cut portion 133a extending outward from the upper cut portion 133b in a direction approximately perpendicular to a length direction. Thus, the cut portions 133 may have an approximately ⌐-shape or T-shape.

The cut portions 133 have free ends such that the free ends may overlap the sealing portion 130 according to deformation of the variable portions 170'. Thus, since the sealing portion 130 is not deformed, stably sealing may be guaranteed.

The variable portions 170' may be convex in a direction toward the spatial portion 140.

FIGS. 22A to 25 illustrate other embodiments of the present disclosure.

Figure 22A:
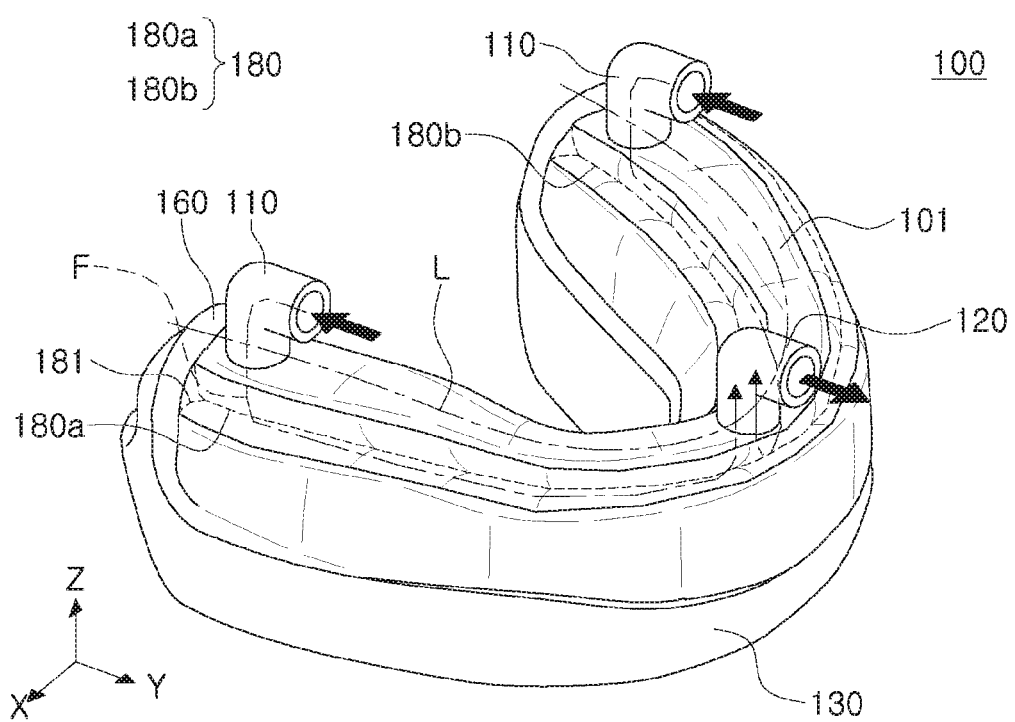
Figure 22B:
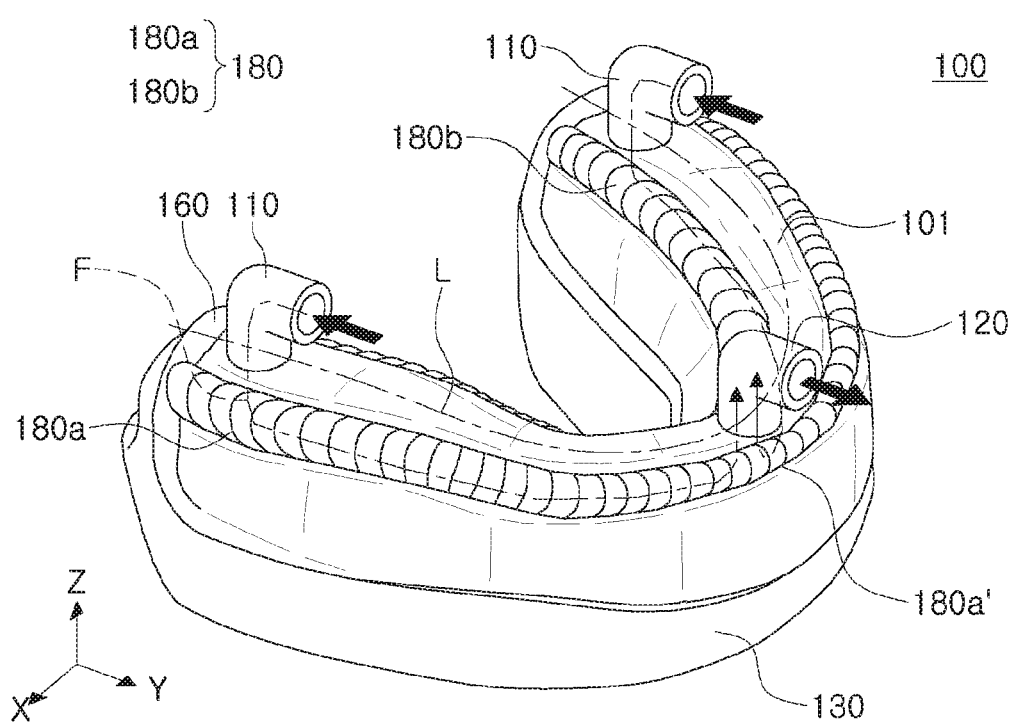

The embodiment shown in FIGS. 22A and 22B is basically the same as the embodiment shown in FIG. 3 or FIGS. 18A to 18C. That is, a care unit 100 includes an outer wall 101, fluid inlets 110, a fluid outlet 120, a sealing portion 130, a spatial portion 140 (refer to FIG. 4), and a connection portion 160. However, the care unit 100 shown in FIGS. 22A and 22B is different from the care unit 100 shown in FIG. 3 or FIGS. 18A to 18C, in that the care unit 100 includes variable portions 180 extending along the outer wall 101 in a length direction L of the care unit 100.

The variable portions 180 include an outer variable portion 180a arranged outside a center line extending in a length direction L of the outer wall 101, and an inner variable portion 180b arranged opposite the outer variable portion 180a based on the center line.

Both the outer and inner variable portions 180a and 180b include folding portions 181 such that the outer and inner variable portions 180a and 180b may be folded toward the spatial portion 140 (refer to FIG. 4). The folding portions 181 are connected to lengthwise end portions of the connection portion 160 and extend in the length direction L of the care unit 100.

In the embodiment shown in FIGS. 22A and 22B, the care unit 100 is not variable in the length direction L of the care unit 100 (Y-axis direction in FIGS. 22A and 22B), but is variable along an outer surface of the outer wall 101, that is, in width and height directions of the care unit 100.

The care unit 100 is to be inserted into the mouth of a human, and since the inside of the mouth contains weak and sensitive tissue, a hard object inserted into the mouth of a user may cause user discomfort. That is, if the care unit 100 is hard, users may be reluctant to use the care unit 100 or may even refuse to use the care unit 100. However, if the care unit 100 is formed of a too soft of a material, force for removing foreign substances by friction with teeth may not be applied to protrusions 150, and thus it may be practically difficult to care for the oral cavity.

The variable portions 180 may minimize displeasure that users may feel in their oral cavity while allowing for the transmission of force to the protrusions 150. In addition, the care unit 100 may easily be inserted even in an oral cavity which is small in a vertical direction, owing to the variable portions 180 allowing for deformation of the care unit 100.

Since the variable portions 180 are formed in the length direction L of the care unit 100, that is, in a flow direction of fluid F, even when the variable portions 180 are folded toward the spatial portion 140, the flow of fluid F may not be affected. The variable portions 180 may be folded inwardly as shown in FIG. 22A or outwardly as shown in FIG. 22B.

Figure 23:
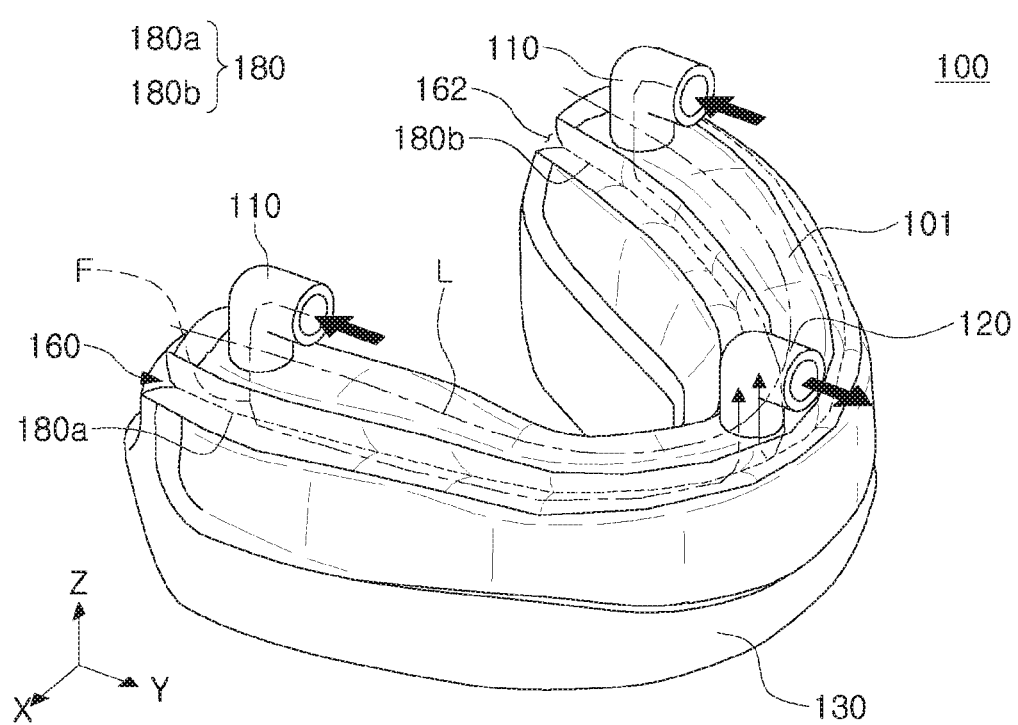

In the embodiment shown in FIG. 23, variable portions 180 are provided, as in the embodiment shown in FIGS. 22A and 22B. However, the embodiment shown in FIG. 23 is different from the embodiment shown in FIGS. 22A and 22B, in that end portions of the variable portions 180 are directly connected to a sealing portion 130 instead of being connected to a connection portion 160. That is, the connection portion 160 includes cut portions 162 in connection regions between the variable portions 180 and the sealing portion 130.

Figure 24:
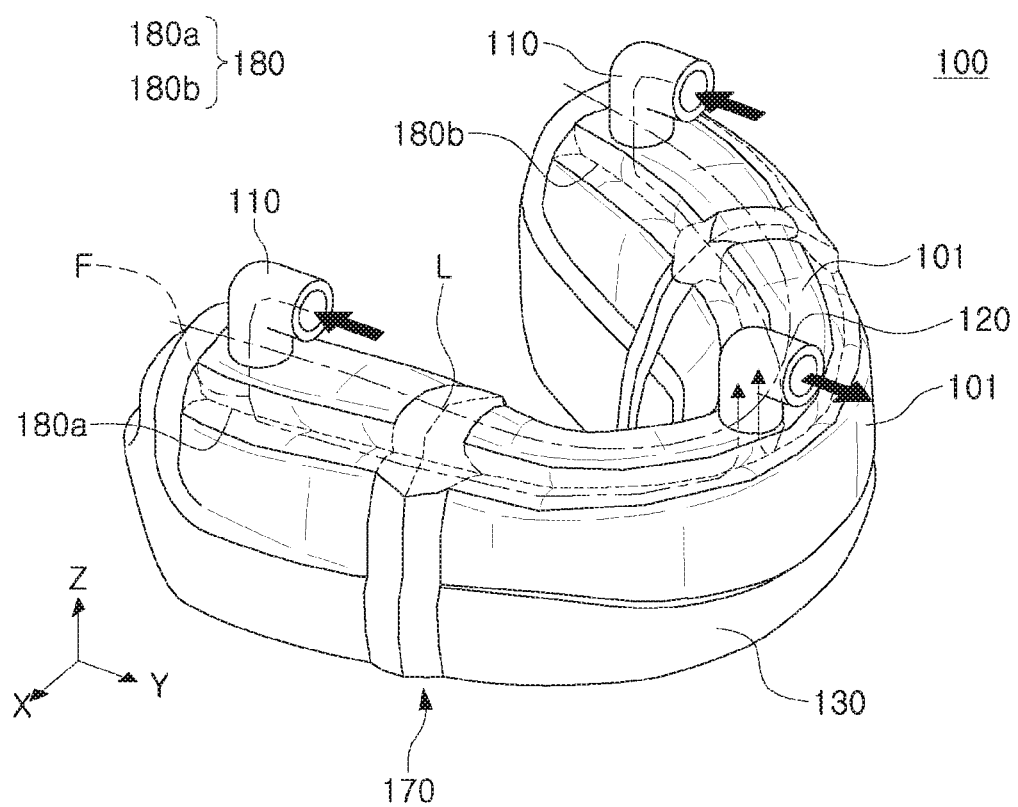

The embodiment shown in FIG. 24 is basically the same as the embodiment shown in FIG. 22A except that additional variable portions 170 are provided.

The additional variable portions 170 are the same as the variable portions 170 described with reference to FIGS. 18A to 19C. That is, in the embodiment shown in FIG. 24, a care unit 100 includes: variable portions 180 extending along an outer wall 101 in the length direction L of the care unit 100; and the additional variable portions 170 extending at least along the outer wall 101 in a direction crossing the length direction L of the care unit 100.

In the embodiment shown in FIG. 24, the care unit 100 is deformable in an inward or outward direction of the oral cavity (Y-axis direction), a width direction of the oral cavity (X-axis direction), and a height direction (Z-axis direction). That is, the care unit 100 is deformable according to the size of the oral cavity of a user.

Figure 25:
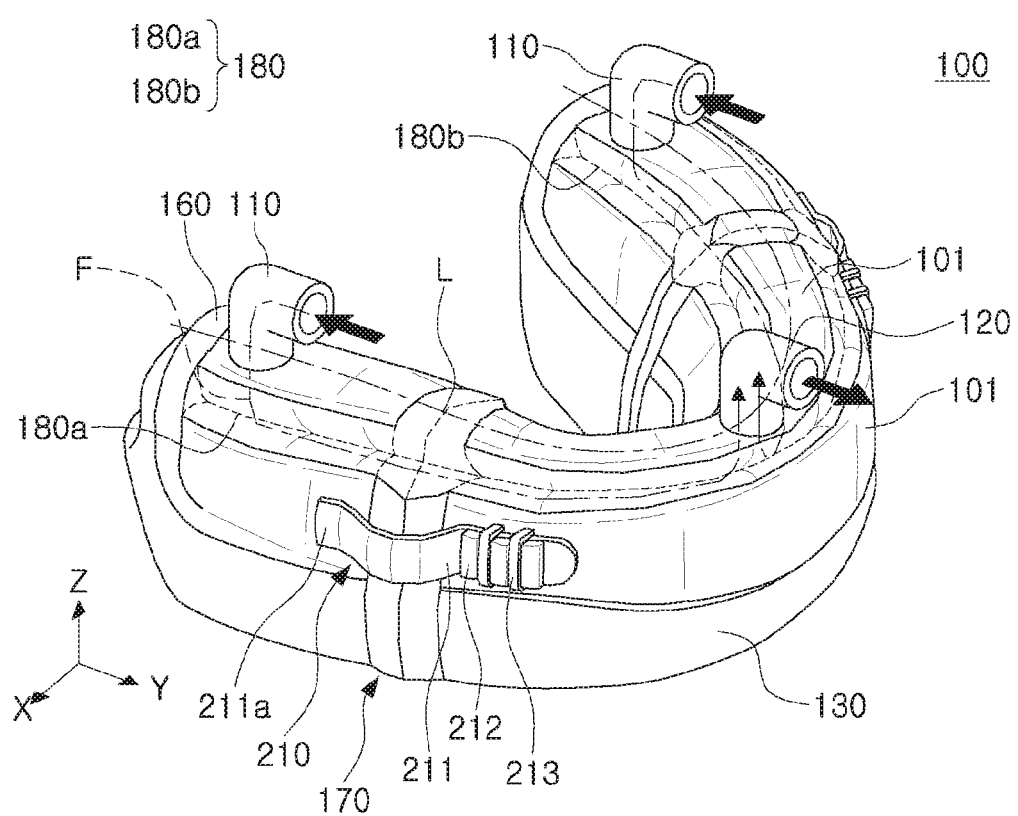

The care unit 100 of the embodiment shown in FIG. 25 is basically the same as the care unit 100 of the embodiment shown in FIG. 24 except that variable portions 170 extend in a direction crossing the length direction of the care unit 100, and the care unit 100 further includes length adjusting portions 210 disposed on both sides of the variable portions 170 in the length direction of the care unit 100.

Each of the length adjusting portions 210 includes: a band connection portion 211a having lengthwise end portions connected to the outer wall 101 with the variable portion 170 being disposed therebetween; adjustment protrusions 212 protruding from an end portion of the band connection portion 211a at regular intervals; rings 213 connected to a center side of the outer wall 101 in the length direction based on the variable portion 170 so as to receive a band 211 and the adjustment protrusions 212.

The rings 213 are configured such that the adjustment protrusions 212 of the band 211 may pass through the rings 213 while the rings 213 or the adjustment protrusions 212 are elastically deformed, and as the adjustment protrusions 212 are hooked on the rings 213, the deformation of the variable portion 170 is restricted, thereby adjusting the length of the care unit 100. The band 211 is less deformable than the variable portion 170 (the same material but a greater thickness, or the same thickness but a less deformable material).

Figure 26A:
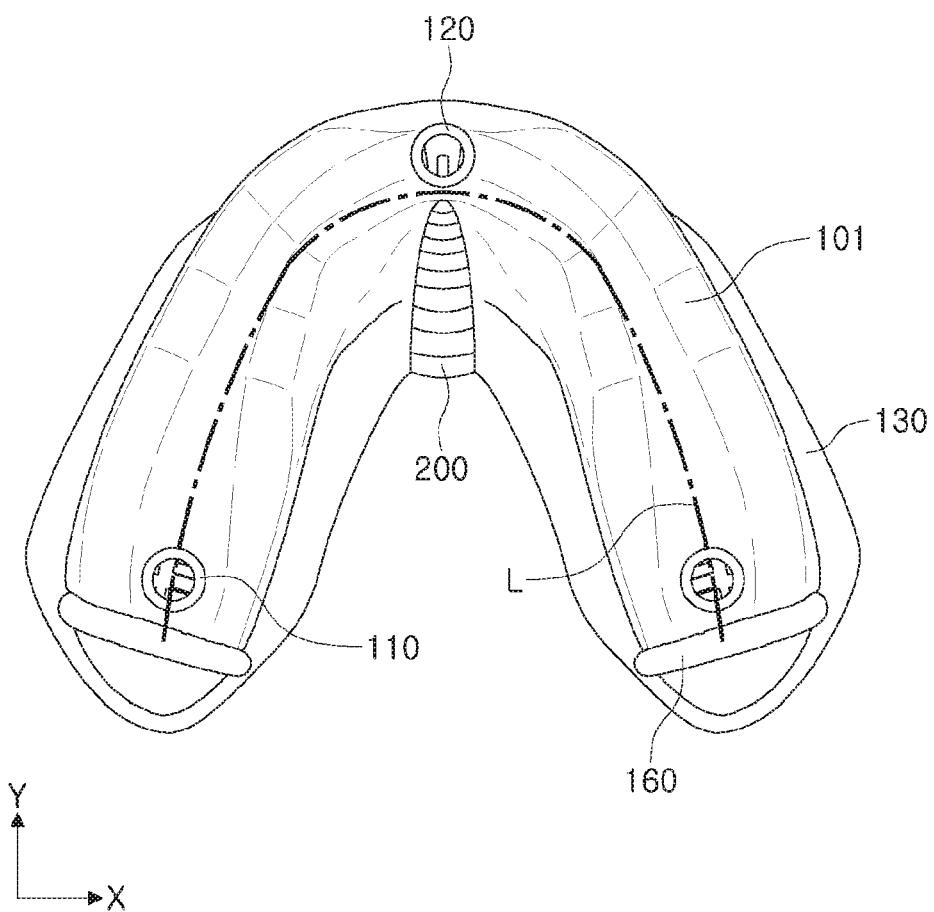
FIGS. 26A to 26C are plan views illustrating another embodiment of the care unit, FIG. 26A illustrating a non-deformed state, FIG. 26B illustrating an inwardly deformed state, and FIG. 26C illustrating an outwardly spread state.
Figure 26B:
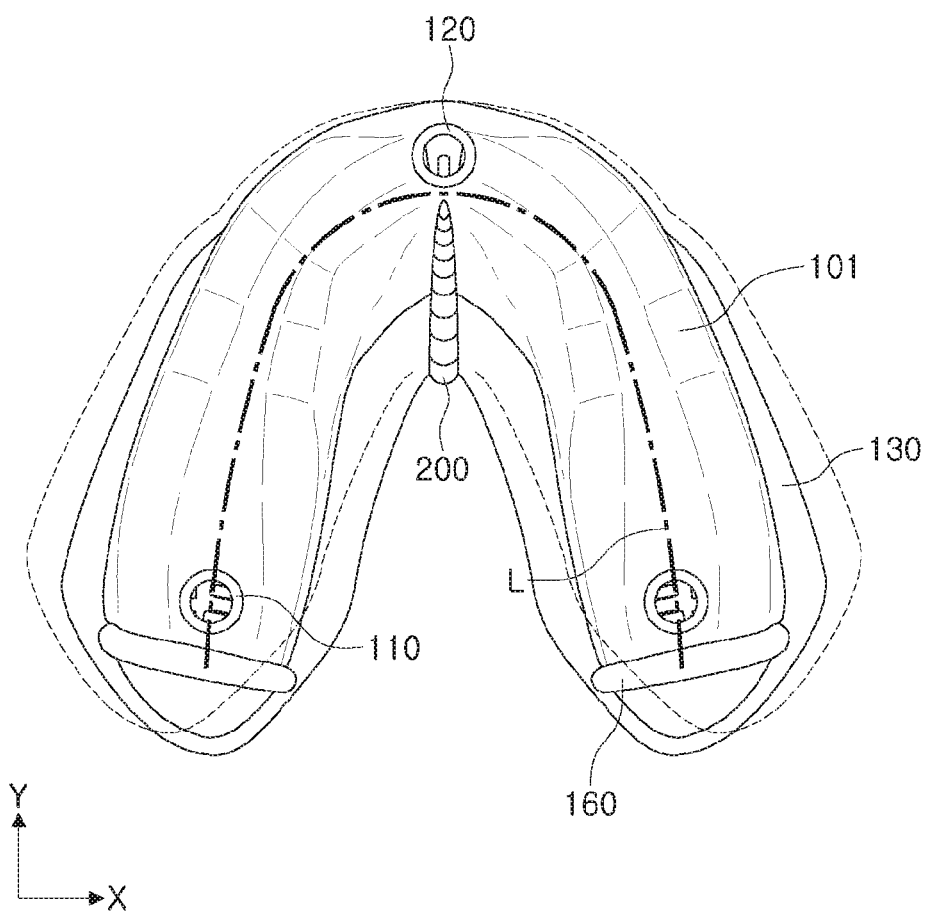
Figure 26C:
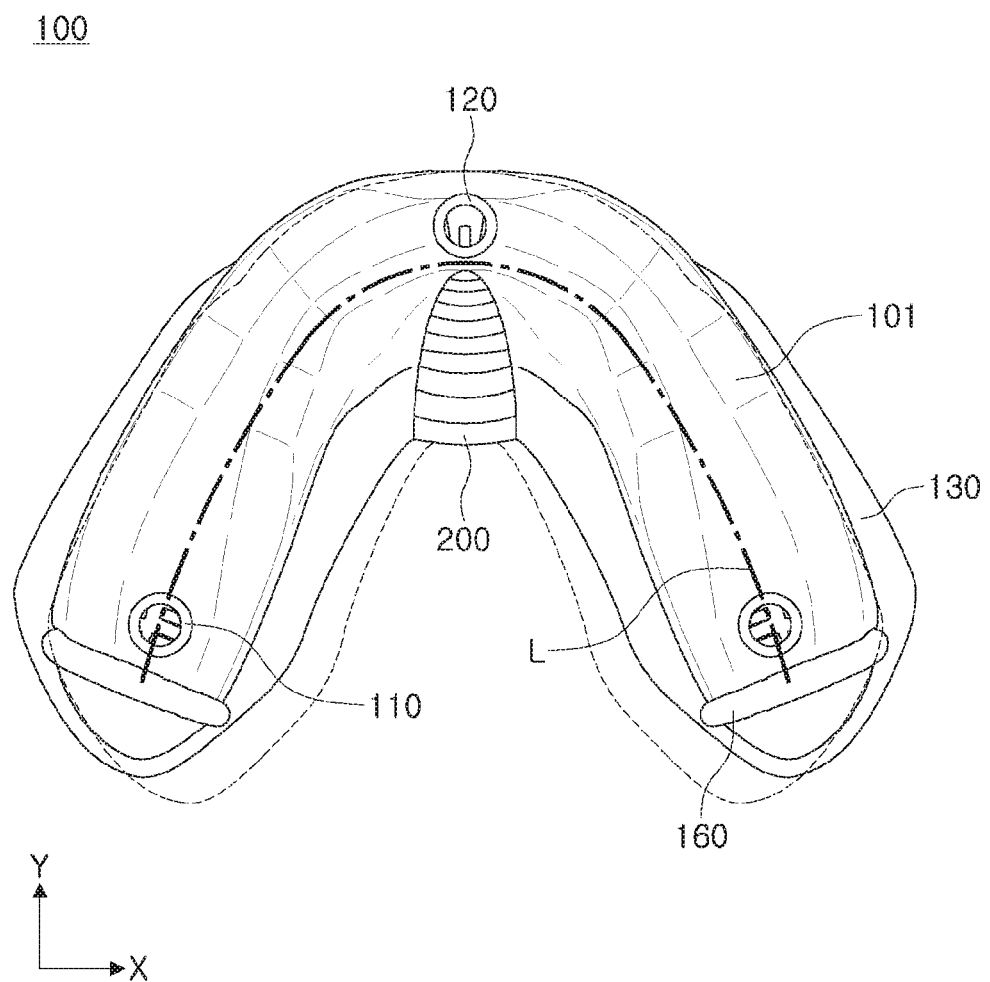

FIGS. 26A to 26C illustrate a care unit 100 according to another embodiment. The care unit 100 shown in FIG. 26 is basically the same as the care unit 100 shown in FIGS. 18A to 18C except for a variable portion 200 formed in inner center regions of the outer wall 101 and the sealing portion 130 in a length direction L. The variable portion 200 is convex in a direction away from or toward a spatial portion 140 (refer to FIG. 4), and as the variable portion 200 is deformed, the width of the care unit 100 may be decreased or increased.

Figure 27:
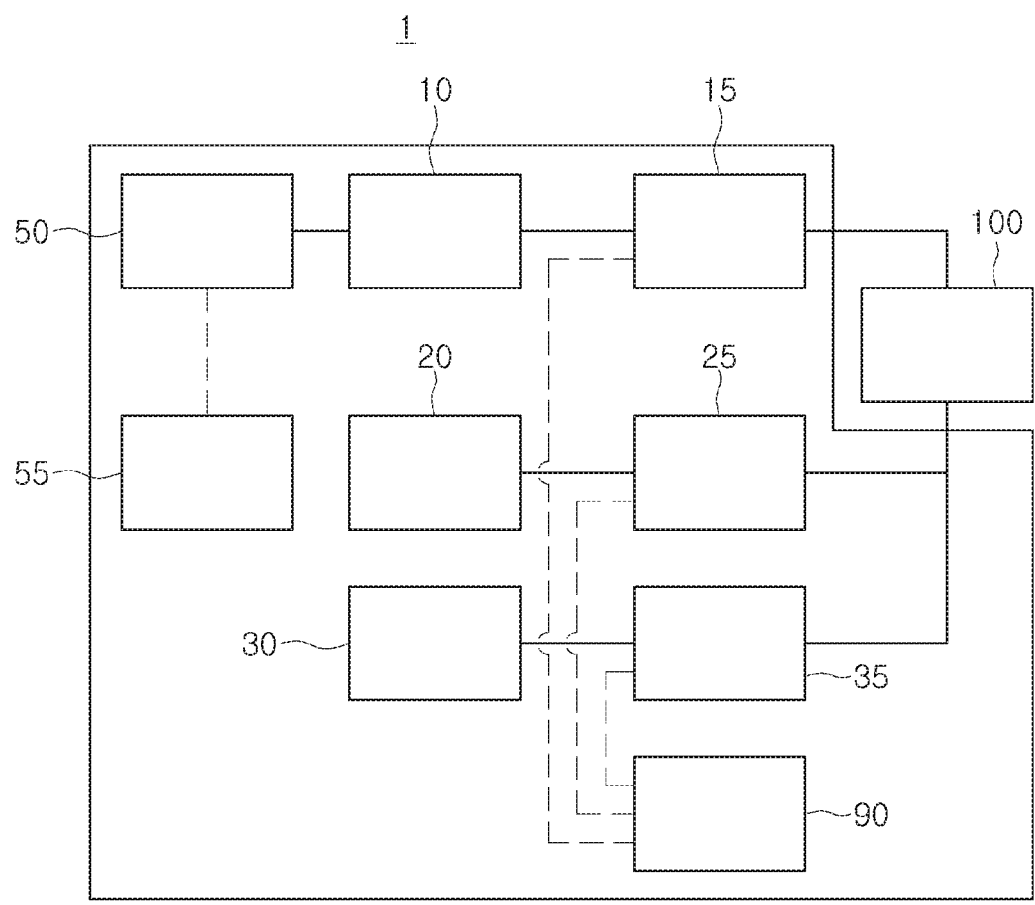
FIG. 27 is a schematic view illustrating another embodiment of the oral care device.

FIG. 27 is a schematic view illustrating an oral care device 1 according to another embodiment of the present disclosure.

The oral care device 1 of the present disclosure includes: a care unit 100 configured to be inserted into the oral cavity of a user to have an effect on the teeth or gums of the user; and a main body connected to the care unit 100 for supplying liquid/gas to the care unit 100 or discharging liquid/gas from the care unit 100.

The oral care device 1 shown in FIG. 27 includes: a liquid supply unit 20; the above-described care unit 100 such as a mouthpiece; a suction unit 15 such as a pump connected to the care unit 100 to introduce liquid into the spatial portion by suctioning liquid from the liquid supply unit 20 and to suction fluid from the spatial portion; a discharge unit 10 such as a storage tank connected to the suction unit 15 to store fluid suctioned from the spatial portion of the care unit 100; and a measuring unit 50 connected to the discharge unit 10 to measure the state of the stored fluid. In this case, liquid of the liquid supply unit 20 is introduced to the spatial portion by only suction force of the suction unit 15, and the care unit 100 is connected to an external connection path 30 communicating with the outside.

The liquid supply unit 20, a liquid control unit 25, the external connection path 30, an air control unit 35, and the suction unit 15 are the same as those described in the previous embodiments, for example, with reference to FIG. 1. Thus, in the following description of the present embodiment, differences, that is, the measuring unit 50 and a transmission unit 55 will be mainly described.

The measuring unit 50 is mounted on a side of the discharge unit 10. Since the measuring unit 50 measures the state of fluid stored in the discharge unit 10, the measuring unit 50 may be mounted on a lower side of the discharge unit 10. However, the measuring unit 50 may be mounted at a particular position inside the discharge unit 10 according to the use and purpose of the measuring unit 50.

Since fluid stored in the discharge unit 10 has passed through the oral cavity by means of the care unit 100, information about the inside of the oral cavity may be obtained from the fluid, and the measuring unit 50 includes a sensor for obtaining such information.

The sensor for obtaining information about the oral cavity may include a total dissolved solid (TDS) sensor to measure total dissolved solids. For example, a TDS meter tester by Xiaomi may be used as the TDS sensor. The TDS sensor is used to measure the amounts of substances in a solution, and the amount of foreign substances (plaque) in the oral cavity may be measured by measuring substances contained in fluid stored in the discharge unit 10, so as to indirectly obtain information about the inside of the oral cavity.

In addition, the measuring unit 50 may include a pH sensor. The pH sensor is used to measure the acidity of solution using electrodes and may be any type configured to measure acidity using an acidity indicator (for example, BTB solution). The acidity of the oral cavity varies according to the state of the oral cavity. That is, the pH of the oral cavity decreases as the oral cavity has bad hygienic conditions. Therefore, since fluid stored in the discharge unit 10 has passed through the oral cavity, the acidity in the oral cavity may be estimated by measuring the acidity of the fluid stored in the discharge unit 10, and thus the hygienic state of the oral cavity may be evaluated.

Alternatively, the measuring unit 50 may include a turbidity sensor configured to measure the turbidity of fluid stored in the discharge unit 10 using a light source and an optical sensor. The turbidity of fluid measured by the turbidity sensor is high when the amounts of foreign substances not dissolved in the fluid are large, and the amounts of non-dissolved foreign substances are large in poor hygienic conditions. Thus, the state of the oral cavity may be measured through turbidity measurement.

In addition, since fluid having passed through the oral cavity includes germs/cells of the oral cavity, a sensor configured to detect diseases using genetic information or other sensors may be used.

The measuring unit 50 may include only one sensor. However, the measuring unit 50 may include a plurality of sensors so as to accurately measure the state of the oral cavity.

In the present embodiment, values measured by the measuring unit 50 may be transmitted to the outside of the oral care device 1 through the transmission unit 55. The transmission unit 55 may transmit measured values to the outside or may transmit, to the outside, values obtained from the measured values using a control unit 90 or other computing units. Here, the term "outside" may refer to an external computing device such as a personal computer, a smartphone, or a server. The external computing device may evaluate the state of the oral cavity of a user based on measured values and may inform the user of evaluation results.

The transmission unit 55 may transmit data to an external computing device using a wireless or wired data transmission element. For example, data may be transmitted by a method known in the related art such as Bluetooth or near-field communication (NFC).

In addition, the discharge unit 10 may be a storage unit configured to store fluid or an ejector configured to discharge fluid to the outside without storing the fluid. In this case, the measuring unit 50 may be mounted on the discharge unit 10 to measure the state of fluid passing through the discharge unit 10. The measuring unit 50 may include the same sensor as that mounted on the discharge unit 10, and in some cases, the measuring unit 50 may measure the state of fluid using a sample of the fluid.

EXAMPLES

Table 1 below shows results of measurement of liquid stored in the discharge unit 10 by the TDS sensor of the measuring unit 50 of the oral care device 1 shown in FIG. 27 in comparison with results of measurement of normal water by the TDS sensor.

TABLE 1

| Examples | Values measured by TDS sensor |
| --- | --- |
| Comparative Example 1 | 78 ppm |
| Comparative Example 2 | 81 ppm |
| Inventive Example 1 | 160 ppm |
| Inventive Example 2 | 176 ppm |
| Inventive Example 3 | 165 ppm |

Comparative Example 1 shows a value measured from water purified using a water purifier, and Comparative Example 2 shows a value measured from tab water.

Inventive Example 1 shows a value measured from liquid stored in the discharge unit 10, the liquid being water purified using a water purifier, supplied to the liquid supply unit 20, forced to pass through the care unit 100 for 10 seconds by operating the suction unit 15 under the control of the control unit 90, and stored in the discharge unit 10. Inventive Example 2 shows a value measured from liquid stored in the discharge unit 10, the liquid being tap water supplied to the liquid supply unit 20, forced to pass through the care unit 100 for 10 seconds by operating the suction unit 15 under the control of the control unit 90, and stored in the discharge unit 10.

Inventive Example 3 shows a value measured from liquid stored in the discharge unit 10, the liquid being tap water supplied to the liquid supply unit 20, forced to pass through the care unit 100 for 15 seconds by operating the suction unit 15 under the control of the control unit 90, and stored in the discharge unit 10.

As shown in Table 1 above, since liquids having passed through the care unit 100 contain foreign substances (plaque) collected from the oral cavity, values measured from the liquids were relatively high and varied according to the state of water before passing through the care unit 100 and the period of time in the care unit 100. That is, large amounts of foreign substances were collected in water that had initially passed through the care unit 100, and after some amounts of foreign substances were collected, relatively small amounts of foreign substances were collected in water that had later passed through the care unit 100.

Therefore, according to the present disclosure, the measuring unit 50 may measure values periodically rather than measuring a value once.

Figure 28:
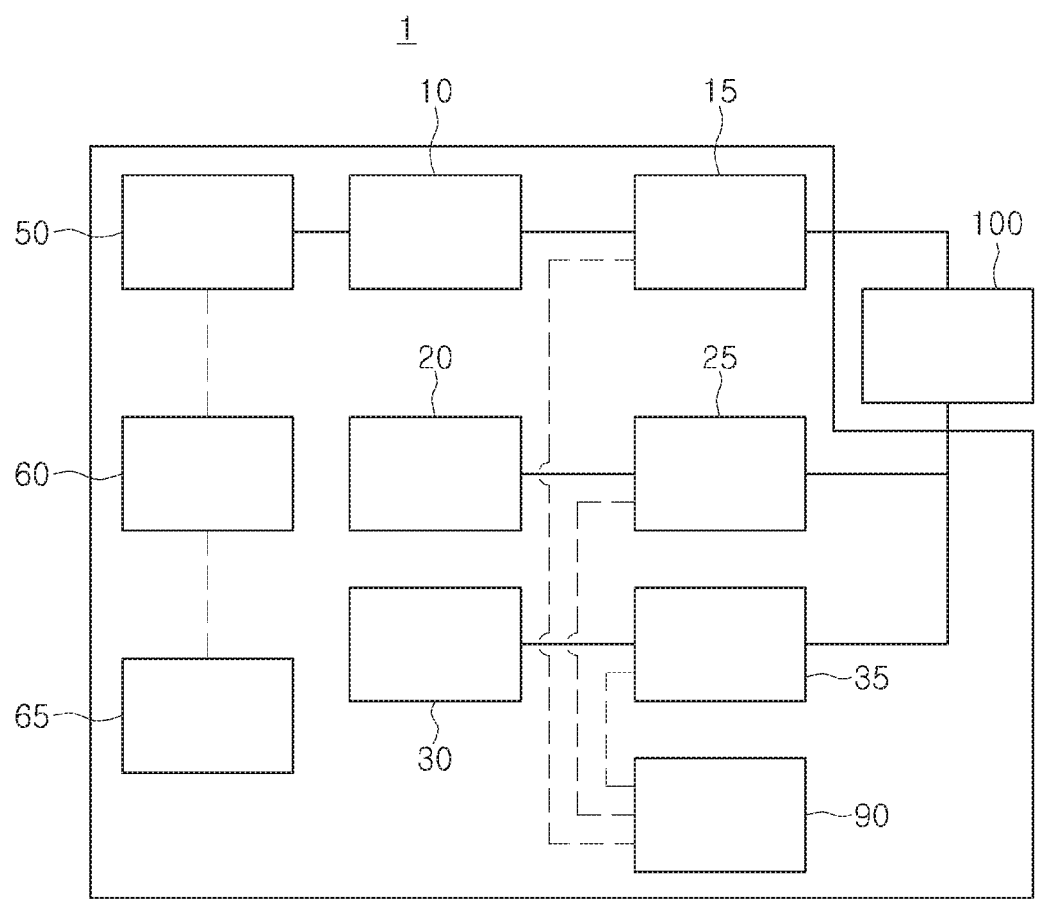
FIG. 28 is a schematic view illustrating another embodiment of the oral care device.

FIG. 28 is a schematic view illustrating an oral care device 1 according to another embodiment of the present disclosure.

The oral care device 1 shown in FIG. 28 includes: a liquid supply unit 20; the above-described care unit 100 such as a mouthpiece; a suction unit 15 such as a pump connected to the care unit 100 to introduce liquid into the spatial portion by suctioning liquid from the liquid supply unit 20 and to suction fluid from the spatial portion; a discharge unit 10 such as a storage tank connected to the suction unit 15 to store fluid suctioned from the spatial portion of the care unit 100; a measuring unit 50 connected to the discharge unit 10 to measure the state of the stored fluid; a computing unit 60 connected to the measuring unit 50 to process and transmit measured values received from the measuring unit 50; and a display unit 65 connected to the computing unit 60 to display processed values or measured values on a screen or dial. In this case, liquid of the liquid supply unit 20 is introduced to the spatial portion by only suction force of the suction unit 15, and the care unit 100 is connected to an external connection path 30 communicating with the outside.

The liquid supply unit 20, a liquid control unit 25, the external connection path 30, an air control unit 35, the suction unit 15, and the measuring unit 50 are the same as those described in the previous embodiments, for example, with reference to FIG. 27. Thus, in the following description of the present embodiment, differences, that is, the computing unit 60 and the display unit 65 connected to the computing unit 60, will be mainly described.

The computing unit 60 receives measured values from the measuring unit 50 to compare the measured values with a reference value or a previously measured value, for example, the immediately previously measured value. The computing unit 60 may include a chip for performing a calculation process.

The display unit 65 is configured to display data received from the computing unit 60. The display unit 65 may include a liquid crystal display or an analog display such as a gauge so as to display states.

The embodiments shown in FIGS. 27 and 28 may be applied to dental chairs. The measuring unit 50 may be applied to a personal oral care device for simple measurement. However, sensors for detecting genetic information or germs may be used only in special locations, such as dental clinics, because the price or size of the sensors.

A water supply line, a drain line, and a suction line may be connected to a dental chair used for dental treatment. The suction line may be connected to a pump in a machine room of a hospital or a pump provided in a dental chair. Since the oral care device 1 of the present disclosure is configured to provide oral care using suction force without using a separate injection unit, the oral care device 1 may be provided with suction force through a suction line connected to a dental chair, and the other elements of the oral care device 1 may be disposed in the dental chair. In this case, overlapping mechanisms may not be used for generating suction force, and sufficient suction force may be obtained because a suction line connected to a dental chair is used.

In addition, since a dental chair has sufficient space, unlike personal equipment, the dental chair may be equipped with various sensors for patients, and thus, various pieces of information about the oral cavity may be obtained using liquid collected with the care unit 100.

In this case, a verification chip may be built in the care unit 100 to associate personal information with the verification chip, and stored liquid information with the personal information. Then, although a plurality of users may use the oral care device 1, user information may be individually managed.

Such information may be stored in a computer connected to the oral care device 1 or an online server, and each user may access the online server using a terminal (for example, a smartphone) to check their personal information.

In addition, stored information may be collected to form a large amount of data that may be used as gender, age, area, or user-specific statistic data.

As set forth above, exemplary embodiments of the present disclosure provide an oral care device and an oral care method designed for obtaining information about the oral cavity.

While exemplary embodiments have been shown and described above, it will be apparent to those skilled in the art that modifications and variations could be made without departing from the scope of the present invention as defined by the appended claims.

What is claimed is:
1. An oral care device comprising:
   a liquid supply tube;
   a mouthpiece connected to the liquid supply tube and comprising a spatial portion configured to accommodate at least one of an upper tooth side and a lower tooth side when the mouthpiece is inserted into an oral cavity;
   a suction pump connected to the mouthpiece and configured to suction liquid from the liquid supply tube and introduce the liquid into the spatial portion and to suction fluid from the spatial portion; and a discharge bin or discharge tube connected to the suction pump and configured to store or discharge fluid suctioned from the spatial portion, wherein liquid is introduced to the spatial portion from the liquid supply tube only by suction force of the suction pump, wherein the mouthpiece further comprises:
- a flexible outer wall forming the spatial portion, wherein the flexible outer wall includes:
  - a front section that has a first end and a second end and that forms a front part of the spatial portion;
  - a first side section that is aligned with the first end of the front section and that forms a first side part of the spatial portion; and
  - a second side section that is aligned with the second end of the front section and that forms a second side part of the spatial portion;
- a sealing portion extending an edge of the outer wall;
- a deformable portion extending from the outer wall in at least a direction crossing a length direction to deform the mouthpiece, wherein:
  - the deformable portion extends from the first end of the front section to the first side section such that the deformable portion forms a joint between the front section and the first side section whereby the first side section is movable relative to the front section; and
- a fluid inlet and a fluid outlet penetrating the outer wall and connected to the spatial portion.

2. The oral care device of claim 1, wherein a liquid supply path to which the liquid supply tube and the mouthpiece are connected is provided with a liquid control valve to control an introduction of liquid into the spatial portion.

3. The oral care device of claim 2, wherein the spatial portion of the mouthpiece is connected to an external connection path communicating with an outside of the spatial portion, and an air control valve is provided in the external connection path to control an introduction of external air into the spatial portion.

4. The oral care device of claim 3, further comprising a computing unit connected to the liquid control valve and the air control valve and configured to control the liquid control valve and the air control valve in a liquid supply mode in which the liquid supply tube and the spatial portion communicate with each other and the suction pump introduces liquid into the spatial portion, an air supply mode in which air is supplied, a vacuum mode in which both liquid and air are not supplied, and a mode in which both liquid and air are supplied.

5. The oral care device of claim 3, wherein the mouthpiece comprises the fluid inlet connected to the liquid supply tube or the external connection path and the fluid outlet connected to the suction pump.

6. The oral care device of claim 5, wherein the mouthpiece further comprises: a connection portion disposed between the outer wall and the sealing portion,
wherein the connection portion is formed of a material thicker or more rigid than that of the outer wall and the sealing portion.

7. The oral care device of claim 6, wherein a plurality of cut portions are formed in the sealing portion along a periphery of the mouthpiece.

8. The oral care device of claim 1, wherein the mouthpiece comprises the fluid inlet connected to the liquid supply tube and the fluid outlet connected to the suction pump, and
fluid introduced through the fluid inlet is discharged through the fluid outlet after passing through the spatial portion.

9. The oral care device of claim 5, wherein a plurality of protrusions protrude inwardly from the outer wall.

10. The oral care device of claim 9, wherein uneven portions are formed on end portions of the protrusions.

11. The oral care device of claim 5, wherein the fluid inlet and the fluid outlet are respectively disposed at front and rear sides of the mouthpiece.

12. The oral care device of claim 1, wherein the deformable portion is thinner than the outer wall.

13. The oral care device of claim 1, wherein a cross-section of the outer wall comprises a first side in a center region and second sides extending from two sides of the first side, and
the deformable portion further comprises a deformation inducing portion including:
- a first portion of the deformable portion extending from the first side and
- second portions of the deformable portion extending from the second sides, wherein the first portion and the second portions are deformed in different directions.

14. The oral care device of claim 1, wherein the outer wall comprises a protrusion extending toward the spatial portion, and
the outer wall of the mouthpiece is deformed by an operation of the suction pump.

15. The oral care device of claim 3, further comprising a measuring sensor connected to the discharge bin or the discharge tube to measure a state of fluid stored or discharged.

16. The oral care device of claim 15, further comprising a transmission module connected to the measuring sensor and comprising a wireless or wired data transmission element, the transmission module being configured to transmit information measured by the measuring sensor or values processed based on the information to an outside.

17. The oral care device of claim 15, further comprising a display panel connected to the measuring sensor and configured to display information measured by the measuring sensor or values processed based on the information.

* * * * *